US012619377B2

(12) United States Patent
Sakamoto et al.

(10) Patent No.: US 12,619,377 B2
(45) Date of Patent: May 5, 2026

(54) STORAGE SYSTEM FOR PREVENTING PERFORMANCE DEGRADATION WHEN A CONTROLLER IS BLOCKED

(71) Applicant: Hitachi Vantara, Ltd., Yokohama (JP)

(72) Inventors: Soichiro Sakamoto, Tokyo (JP); Tomohiro Yoshihara, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/829,835

(22) Filed: Sep. 10, 2024

(65) Prior Publication Data

US 2025/0208784 A1    Jun. 26, 2025

(30) Foreign Application Priority Data

Dec. 22, 2023    (JP) ................................. 2023-217108

(51) Int. Cl.
G06F 3/06 (2006.01)

(52) U.S. Cl.
CPC .......... G06F 3/0655 (2013.01); G06F 3/0604 (2013.01); G06F 3/0683 (2013.01)

(58) Field of Classification Search
CPC ..... G06F 3/0655; G06F 3/0604; G06F 3/0683
See application file for complete search history.

(56) References Cited

U.S. PATENT DOCUMENTS

2007/0079063 A1* 4/2007 Mizuno ................... G06F 3/067
                                                711/170
2008/0244290 A1  10/2008 Yoshida et al.

2008/0244295 A1* 10/2008 Mizuno ................. G06F 3/0625
                                                713/324
2013/0185582 A1*  7/2013 Tsukamoto ........... G06F 3/0625
                                                713/340
2014/0101279 A1   4/2014 Nagami et al.
2022/0091657 A1*  3/2022 Tsien .................... G06F 1/3278
(Continued)

FOREIGN PATENT DOCUMENTS

JP        2008250945 A    10/2008
JP        2015531091 A    10/2015
(Continued)

OTHER PUBLICATIONS

Japanese Office Action dated Feb. 3, 2026 for Japanese Patent Application No. 2023-217108.

*Primary Examiner* — Ryan Bertram
(74) *Attorney, Agent, or Firm* — Volpe Koenig

(57)    ABSTRACT

A storage system including a plurality of storage drives that provide a storage capacity of data; and a plurality of storage controllers that execute data write or read processing, in which each of the plurality of controllers includes: a component that includes at least a CPU capable of changing performance by changing an amount of power to be supplied; and a memory that stores a power control program controlling a target value of power consumption of the component, when the power control program is executed by the CPU, in response to detection of a blocked controller among the plurality of controllers, a function of raising the target value of the power consumption for the component included in the controller is executed in a normal controller configuring a redundant system for the controller that causes the blocking.

15 Claims, 22 Drawing Sheets

209

| MOUNTED DEVICE | MOUNTING POSITION | DEVICE IDENTIFICATION INFORMATION | FAILURE COUNT | BLOCKING STATE |
|---|---|---|---|---|
| CONTROLLER | 0 | X | 1 | NORMAL |
| CONTROLLER | 1 | X | 3 | FAILURE BLOCKING |
| ... | ... | ... | ... | ... |
| DRIVE | 0 | F | 0 | NORMAL |
| DRIVE | 1 | F | 0 | NORMAL |
| ... | ... | ... | ... | ... |

(56)                    References Cited

U.S. PATENT DOCUMENTS

| | | | |
|---|---|---|---|
| 2024/0069761 A1 | 2/2024 | Okada et al. | |
| 2025/0077098 A1* | 3/2025 | Shimada | G06F 3/0625 |

FOREIGN PATENT DOCUMENTS

| | | |
|---|---|---|
| JP | 2020106927 A | 7/2020 |
| JP | 2024-033475 A | 3/2024 |
| WO | 2018/193608 A1 | 10/2018 |

* cited by examiner

107

MEMORY

POWER CONTROL PROGRAM　200

COOLING PERFORMANCE CONTROL PROGRAM　201

TEMPERATURE CONTROL PROGRAM　202

FAILURE MONITORING PROGRAM　203

LOAD MONITORING PROGRAM　204

SYSTEM INFORMATION MANAGEMENT TABLE　205

POWER MODE TABLE　206

PARITY GROUP CONFIGURATION INFORMATION TABLE　207

TEMPERATURE MANAGEMENT TABLE　208

BLOCKING STATE MANAGEMENT TABLE　209

FIG. 3

205

| MOUNTED DEVICE | MOUNTING POSITION | DEVICE IDENTIFICATION INFORMATION | STATE | POWER CONSUMPTION | PROCESSING LOAD | POWER MODE |
|---|---|---|---|---|---|---|
| CONTROLLER | 0 | X | Active | - | - | - |
| CONTROLLER | 1 | X | Active | - | - | - |
| POWER SUPPLY UNIT | 0 | Y | Active | 1800W | - | - |
| POWER SUPPLY UNIT | 1 | Y | Active | 1800W | - | - |
| ... | ... | ... | ... | ... | ... | ... |
| FE I/F | 0 | A | Active | 12W | 40% | 2 |
| FE I/F | 1 | A | Active | 12W | 40% | 2 |
| ... | ... | ... | ... | ... | | ... |
| BE I/F | 0 | B | Active | 8W | 40% | 2 |
| ... | ... | ... | ... | ... | | ... |
| CPU | 0 | C | Active | 200W | 85% | 0 |
| CPU | 1 | C | Active | 130W | 40% | 2 |
| ... | ... | ... | ... | ... | | ... |
| MEMORY | 0 | D | Active | 6W | 30% | 2 |
| MEMORY | 1 | D | Active | 6W | 30% | 2 |
| MEMORY | 2 | Null | Inactive | 0W | 0% | - |
| ... | ... | ... | ... | ... | ... | ... |
| FAN | 0 | E | Active | 80W | 90% | 0 |
| FAN | 1 | E | Active | 40W | 40% | 2 |
| ... | ... | ... | ... | ... | ... | ... |
| DRIVE (SSD) | 0 | F | Active | 12W | 45% | 2 |
| DRIVE (SSD) | 1 | F | Active | 12W | 45% | 2 |
| DRIVE (SSD) | 2 | Null | Inactive | 0W | 0% | - |
| ... | ... | ... | ... | ... | ... | ... |

| MOUNTED DEVICE | POWER MODE | POWER CONSUMPTION | PROCESSING CAPABILITY |
|---|---|---|---|
| CPU | 0 | 3.0GHz: 200W | 100% |
| | 1 | 2.4GHz: 160W | 80% |
| | 2 | 1.8GHz: 130W | 60% |
| | 3 | 1.2GHz: 90W | 40% |
| FAN | 0 | 80W | 100% |
| | 1 | 60W | 80% |
| | 2 | 40W | 60% |
| | 3 | 20W | 40% |
| FE I/F | 0 | 20W | 100% |
| | 1 | 16W | 80% |
| | 2 | 12W | 60% |
| | 3 | 8W | 40% |
| BE I/F | 0 | 12W | 100% |
| | 1 | 10W | 80% |
| | 2 | 8W | 65% |
| | 3 | 4W | 35% |
| MEMORY | 0 | 10W | 100% |
| | 1 | 8W | 80% |
| | 2 | 6W | 60% |
| | 3 | 2W | 20% |
| DRIVE (SSD) | 0 | 24W | 100% |
| | 1 | 18W | 75% |
| | 2 | 12W | 50% |
| | 3 | 8W | 33% |
| DRIVE (HDD) | 0 | 15W | 100% |
| | 1 | 12W | 80% |
| | 2 | 9W | 60% |
| | 3 | 6W | 40% |

207

| DRIVE MOUNTING POSITION | PARITY GROUP |
|---|---|
| 0 | 0 |
| 1 | 0 |
| 2 | SPARE |
| ... | ... |

| MOUNTED DEVICE | MOUNTING POSITION | DEVICE IDENTIFICATION INFORMATION | CURRENT TEMPERATURE | TEMPERATURE THRESHOLD (WITH MARGIN) | TEMPERATURE THRESHOLD (LIMIT VALUE) |
|---|---|---|---|---|---|
| CONTROLLER | 0 | X | 58°C | 56°C | 80°C |
| CONTROLLER | 1 | X | 40°C | 56°C | 80°C |
| ⋮ | ⋮ | ⋮ | ⋮ | ⋮ | ⋮ |
| DRIVE | 0 | F | 32°C | 49°C | 70°C |
| DRIVE | 1 | F | 30°C | 49°C | 70°C |
| ⋮ | ⋮ | ⋮ | ⋮ | ⋮ | ⋮ |

| MOUNTED DEVICE | MOUNTING POSITION | DEVICE IDENTIFICATION INFORMATION | FAILURE COUNT | BLOCKING STATE |
|---|---|---|---|---|
| CONTROLLER | 0 | X | 1 | NORMAL |
| CONTROLLER | 1 | X | 3 | FAILURE BLOCKING |
| ⋮ | ⋮ | ⋮ | ⋮ | ⋮ |
| DRIVE | 0 | F | 0 | NORMAL |
| DRIVE | 1 | F | 0 | NORMAL |
| ⋮ | ⋮ | ⋮ | ⋮ | ⋮ |

FIG. 8

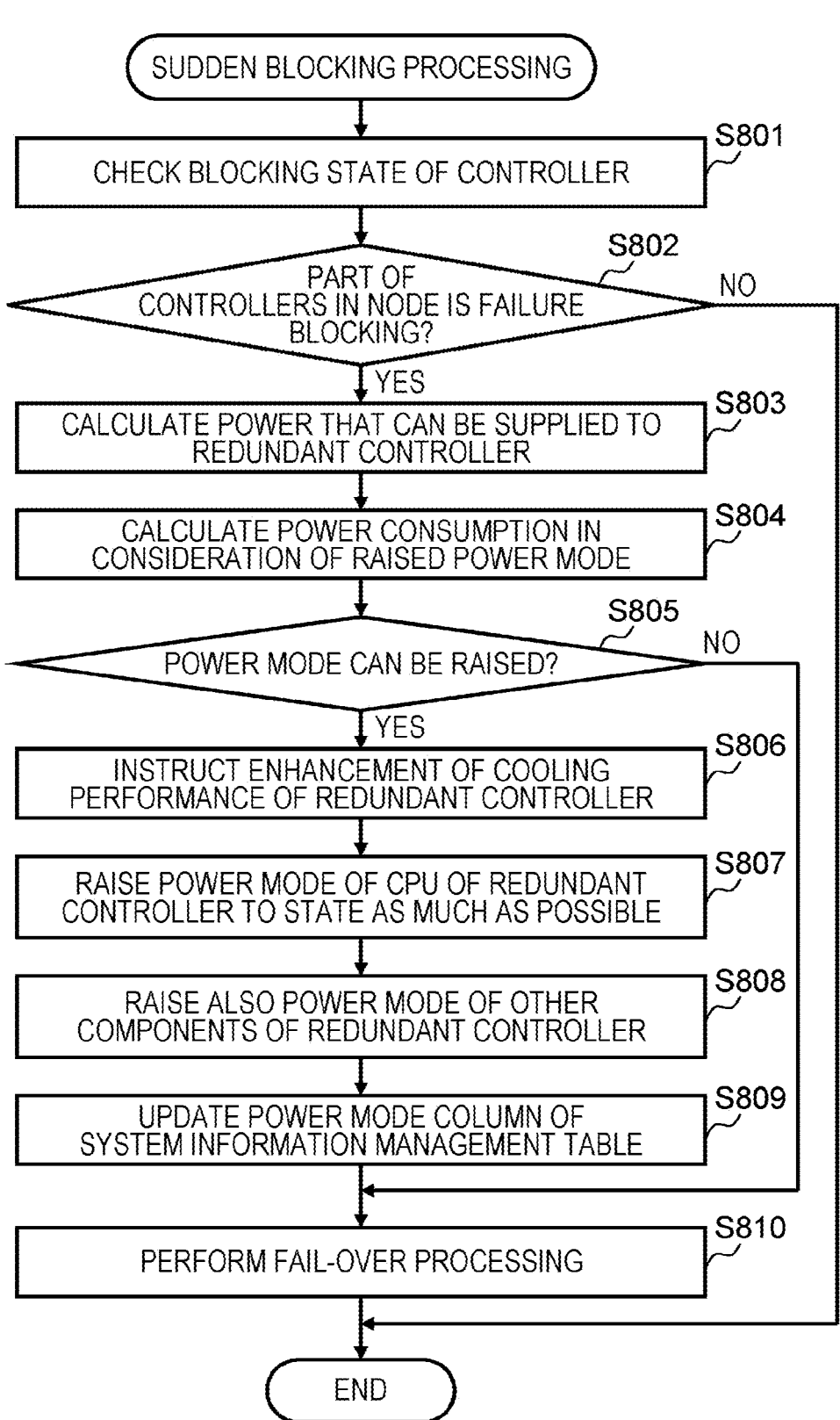

SUDDEN BLOCKING PROCESSING

CHECK BLOCKING STATE OF CONTROLLER    S801

PART OF CONTROLLERS IN NODE IS FAILURE BLOCKING?    S802    NO

YES

CALCULATE POWER THAT CAN BE SUPPLIED TO REDUNDANT CONTROLLER    S803

CALCULATE POWER CONSUMPTION IN CONSIDERATION OF RAISED POWER MODE    S804

POWER MODE CAN BE RAISED?    S805    NO

YES

INSTRUCT ENHANCEMENT OF COOLING PERFORMANCE OF REDUNDANT CONTROLLER    S806

RAISE POWER MODE OF CPU OF REDUNDANT CONTROLLER TO STATE AS MUCH AS POSSIBLE    S807

RAISE ALSO POWER MODE OF OTHER COMPONENTS OF REDUNDANT CONTROLLER    S808

UPDATE POWER MODE COLUMN OF SYSTEM INFORMATION MANAGEMENT TABLE    S809

PERFORM FAIL-OVER PROCESSING    S810

END

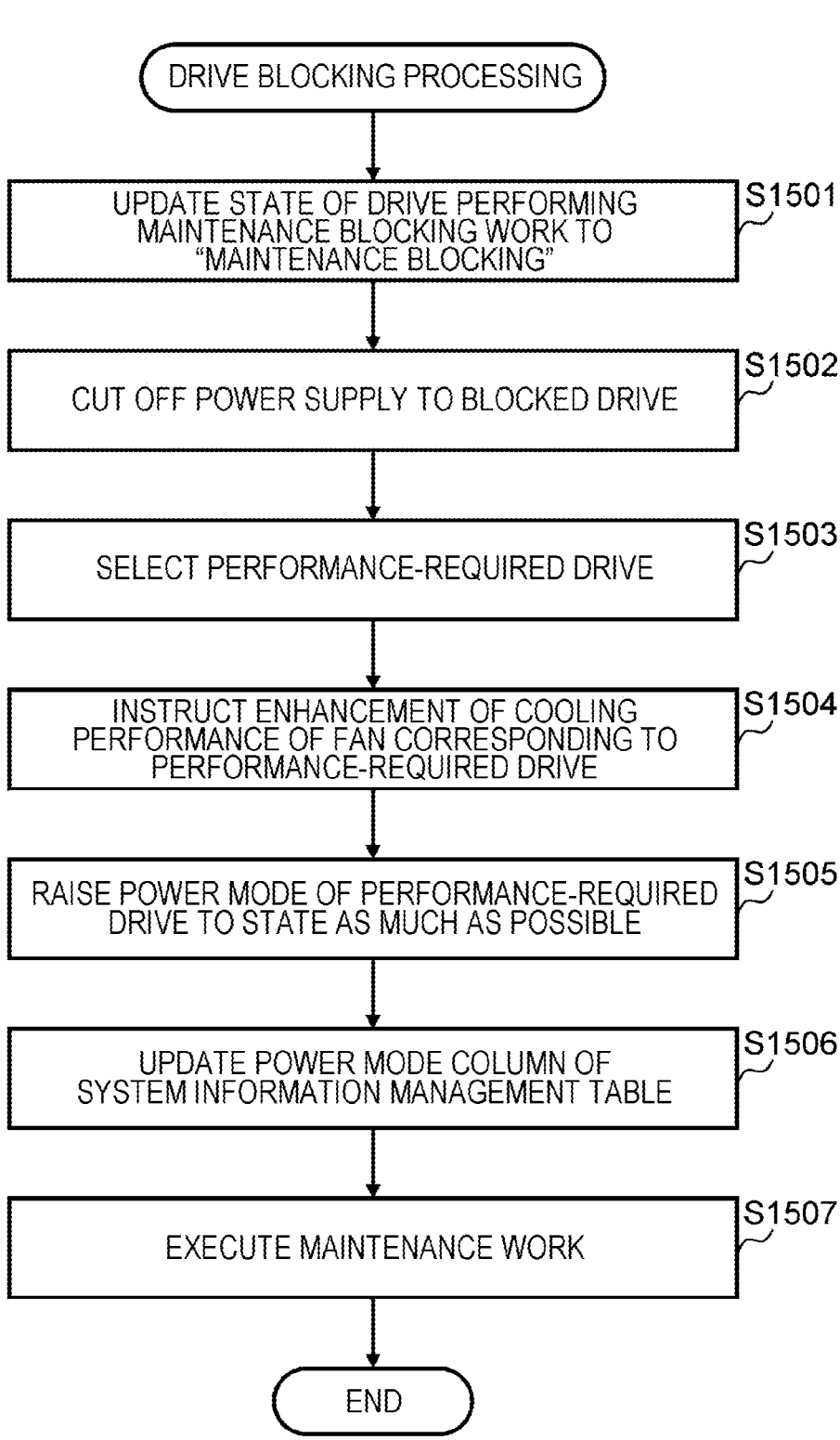

DRIVE BLOCKING PROCESSING

UPDATE STATE OF DRIVE PERFORMING MAINTENANCE BLOCKING WORK TO "MAINTENANCE BLOCKING" — S1501

CUT OFF POWER SUPPLY TO BLOCKED DRIVE — S1502

SELECT PERFORMANCE-REQUIRED DRIVE — S1503

INSTRUCT ENHANCEMENT OF COOLING PERFORMANCE OF FAN CORRESPONDING TO PERFORMANCE-REQUIRED DRIVE — S1504

RAISE POWER MODE OF PERFORMANCE-REQUIRED DRIVE TO STATE AS MUCH AS POSSIBLE — S1505

UPDATE POWER MODE COLUMN OF SYSTEM INFORMATION MANAGEMENT TABLE — S1506

EXECUTE MAINTENANCE WORK — S1507

END

FIG. 16

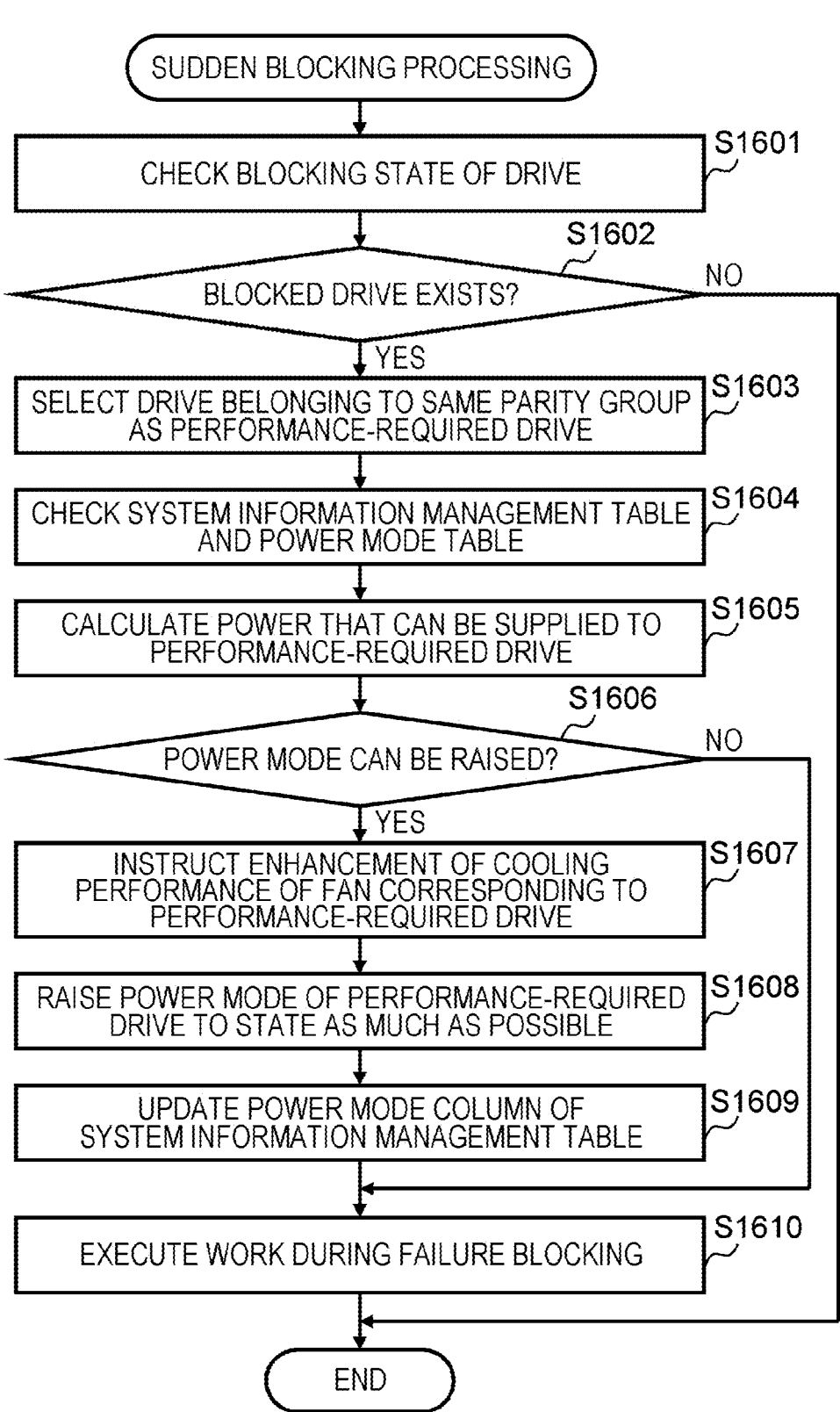

SUDDEN BLOCKING PROCESSING

CHECK BLOCKING STATE OF DRIVE — S1601

BLOCKED DRIVE EXISTS? — S1602    NO

YES

SELECT DRIVE BELONGING TO SAME PARITY GROUP AS PERFORMANCE-REQUIRED DRIVE — S1603

CHECK SYSTEM INFORMATION MANAGEMENT TABLE AND POWER MODE TABLE — S1604

CALCULATE POWER THAT CAN BE SUPPLIED TO PERFORMANCE-REQUIRED DRIVE — S1605

POWER MODE CAN BE RAISED? — S1606    NO

YES

INSTRUCT ENHANCEMENT OF COOLING PERFORMANCE OF FAN CORRESPONDING TO PERFORMANCE-REQUIRED DRIVE — S1607

RAISE POWER MODE OF PERFORMANCE-REQUIRED DRIVE TO STATE AS MUCH AS POSSIBLE — S1608

UPDATE POWER MODE COLUMN OF SYSTEM INFORMATION MANAGEMENT TABLE — S1609

EXECUTE WORK DURING FAILURE BLOCKING — S1610

END

STORAGE SYSTEM FOR PREVENTING PERFORMANCE DEGRADATION WHEN A CONTROLLER IS BLOCKED

BACKGROUND OF THE INVENTION

1. Field of the Invention

The present invention relates to a storage system, and is preferably applied to, for example, a storage system related to a technique of changing performance by changing supplied power.

2. Description of the Related Art

Generally, in the storage system, a plurality of controllers are mounted for redundancy. When one controller executing certain processing is blocked due to a breakdown or the like, the other controller can take over the processing to continue I/O processing. However, as a result of taking over the processing, the other controller becomes a high load, and there is a risk that performance of the entire storage system is degraded.

In addition, in recent years, a technique for maintaining high performance while optimizing power allocation of the storage system to control power consumption has been required. For example, WO 2018/193608 A discloses a technique for controlling power of a storage drive and dynamically optimizing the power allocation according to a load. In WO 2018/193608 A, the power allocation is determined based on a configuration of a flash drive as the storage drive and a power supply capability of the storage system.

SUMMARY OF THE INVENTION

However, in the technique described in WO 2018/193608 A, for example, a state in which some components configuring the storage system are blocked due to maintenance work or generation of failure is not assumed, and when the some components are blocked, there is a risk that the performance of the entire storage system is degraded.

The present invention has been made in view of the above points, and an object of the present invention is to propose a storage system capable of preventing the performance degradation of the entire storage system even after some components are blocked.

In order to solve such a problem, according to the present invention, a storage system includes: a plurality of storage drives that provide a storage capacity of data; and a plurality of storage controllers that execute data write or read processing with the storage drive, in which each of the plurality of controllers includes: a component that includes at least a central processing unit (CPU) capable of changing performance by changing an amount of power to be supplied; and a memory that stores a power control program controlling a target value of power consumption of the component, when the CPU executes the power control program, in response to detection of a blocked controller among the plurality of controllers, a function of raising the target value of the power consumption for the component included in the controller is executed in a normal controller configuring a redundant system for the controller that causes the blocking.

According to the present invention, the performance degradation of the entire storage system can be prevented even after some components are blocked.

BRIEF DESCRIPTION OF THE DRAWINGS

FIG. 3 is a view illustrating an example of a system information management table in FIG. 2;

FIG. 4 is a view illustrating an example of a power mode table in FIG. 2;

FIG. 6A is a view illustrating an example of a temperature management table in FIG. 2;

FIG. 6B is a view illustrating an example of a blocking state management table in FIG. 2;

FIG. 8 is a flowchart illustrating an example of a procedure of sudden blocking processing;

FIG. 13 is a flowchart illustrating an example of a procedure of failure monitoring processing;

FIG. 15 is a flowchart illustrating an example of a procedure of drive blocking processing of blocking a part of drive in association with refilling work;

FIG. 16 is a flowchart illustrating an example of the procedure of the sudden blocking processing;

DESCRIPTION OF THE PREFERRED EMBODIMENTS

Hereinafter, an embodiment of the present invention will be described with reference to the accompanying drawings.

Figure 1:
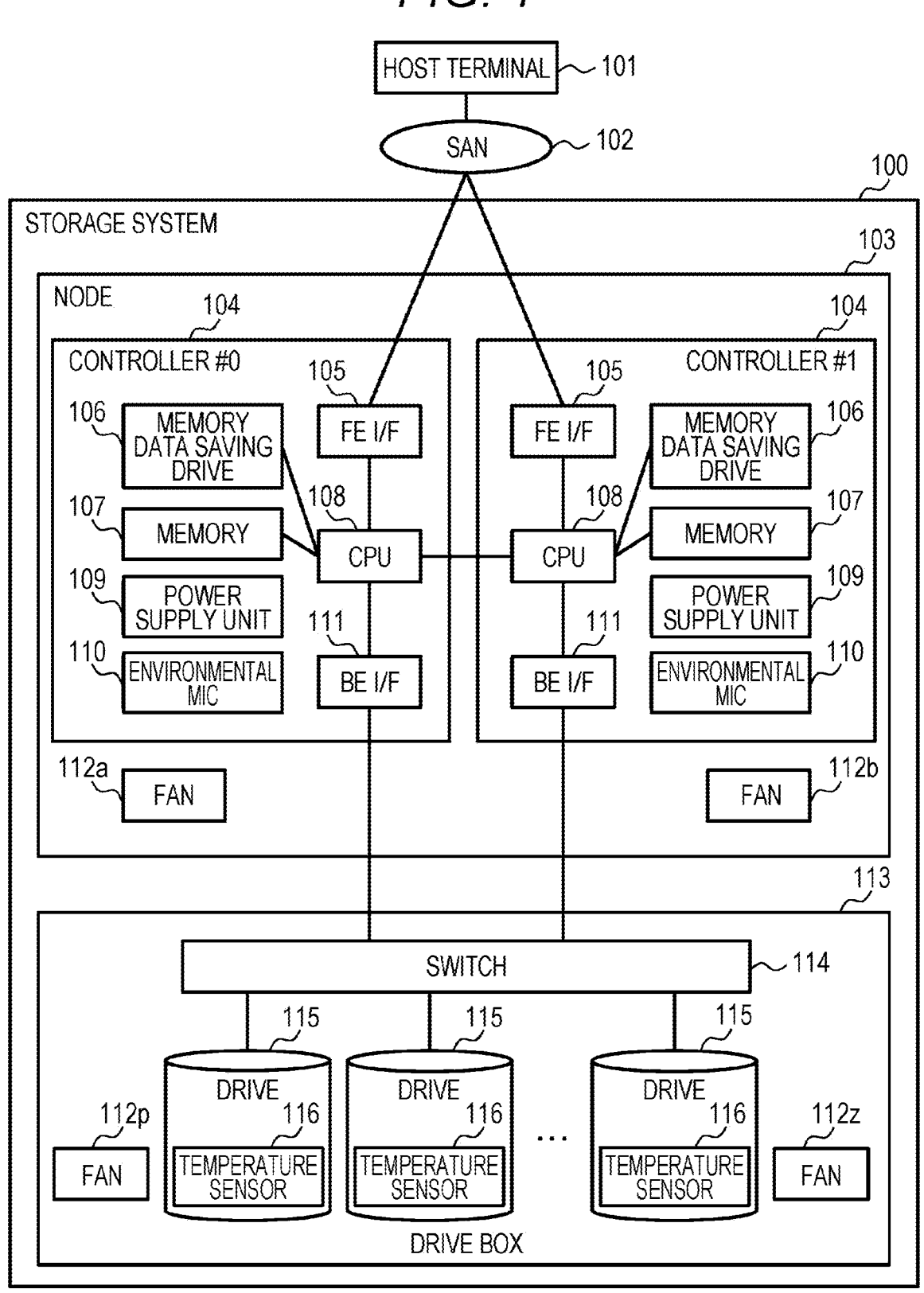
FIG. 1 is a block diagram illustrating a configuration example of a storage system according to a first embodiment.

FIG. 1 is a block diagram illustrating a configuration example of a storage system 100 according to a first embodiment. The storage system 100 includes one node 103 including a plurality of controllers 104 and a drive box 113 storing a drive 115 that is a storage device. For example, the node 103 includes two controllers 104. The drive box 113 includes a plurality of drives 115. In the first embodiment, the plurality of drives 115 are grouped by, for example, a redundant array of independent disks (RAID), and a parity group is formed for each of the plurality of drives 115 belonging to each group.

The node 103 includes a FAN 112 in addition to the controller 104. The drive box 113 also includes the FAN 112. The controller 104 has a function of providing a host terminal 101 with a volume that is a target for reading and writing data.

The controller 104 includes a memory data saving drive 106, a memory 107, a CPU 108, a power supply unit 109, an environmental microcomputer (hereinafter also abbreviated as "environmental MIC") 110, a front-end interface (hereinafter also abbreviated as "FE I/F") 105, and a back-end interface (hereinafter also abbreviated as "BE I/F") 111.

For example, the drive 115 is a solid state drive (SSD) using a flash memory as a storage medium or a hard disk drive (HDD) using a magnetic disk as a storage medium. For example, the memory is a semiconductor memory such as a dynamic random access memory (DRAM). For example, the memory data saving drive is a drive such as an SSD, and is used to save a content of the memory when external power is lost.

The power supply unit 109 supplies power to the storage system 100. A FAN 112a cools one of the controllers 104. A FAN 112b cools the other controller 104. The FANS 112p to 112z independently cool each drive 115. In the first embodiment, these FANs 112a, 112b, 112p to 112z are also collectively referred to simply as "FAN 112" in a case where it is not particularly necessary to distinguish them. An environmental MIC 110 acquires environmental information. At this point, for example, the environmental information is a temperature and power consumption of the controller 104. The temperature of the drive 115 is acquired by each temperature sensor 116 mounted on each drive 115.

For example, the FE I/F 105 is a Fibre Channel Host Bus Adapter (HBA) or a Network Interface Controller (NIC). For example, the BE I/F 111 is a Serial Attached SCSI (SAS) HBA, a PCI express (hereinafter, it is abbreviated as "PCIe") adapter, or the NIC.

For example, each controller 104 and the drive 115 are connected by a switch 114. In addition, the CPUs 108 of the plurality of controllers 104 are connected to each other by an interconnect such as PCIe. For example, the CPUs 108 may be connected to each other through a PCIe switch. The storage system 100 is connected to a storage area network (SAN) 102 such as Fibre Channel or Ethernet. In addition, the host terminal 101 is also connected to an SAN 102. The SAN 102 may include a switch and the like. In addition, a plurality of hosts may be connected to the SAN 102.

Figure 2:
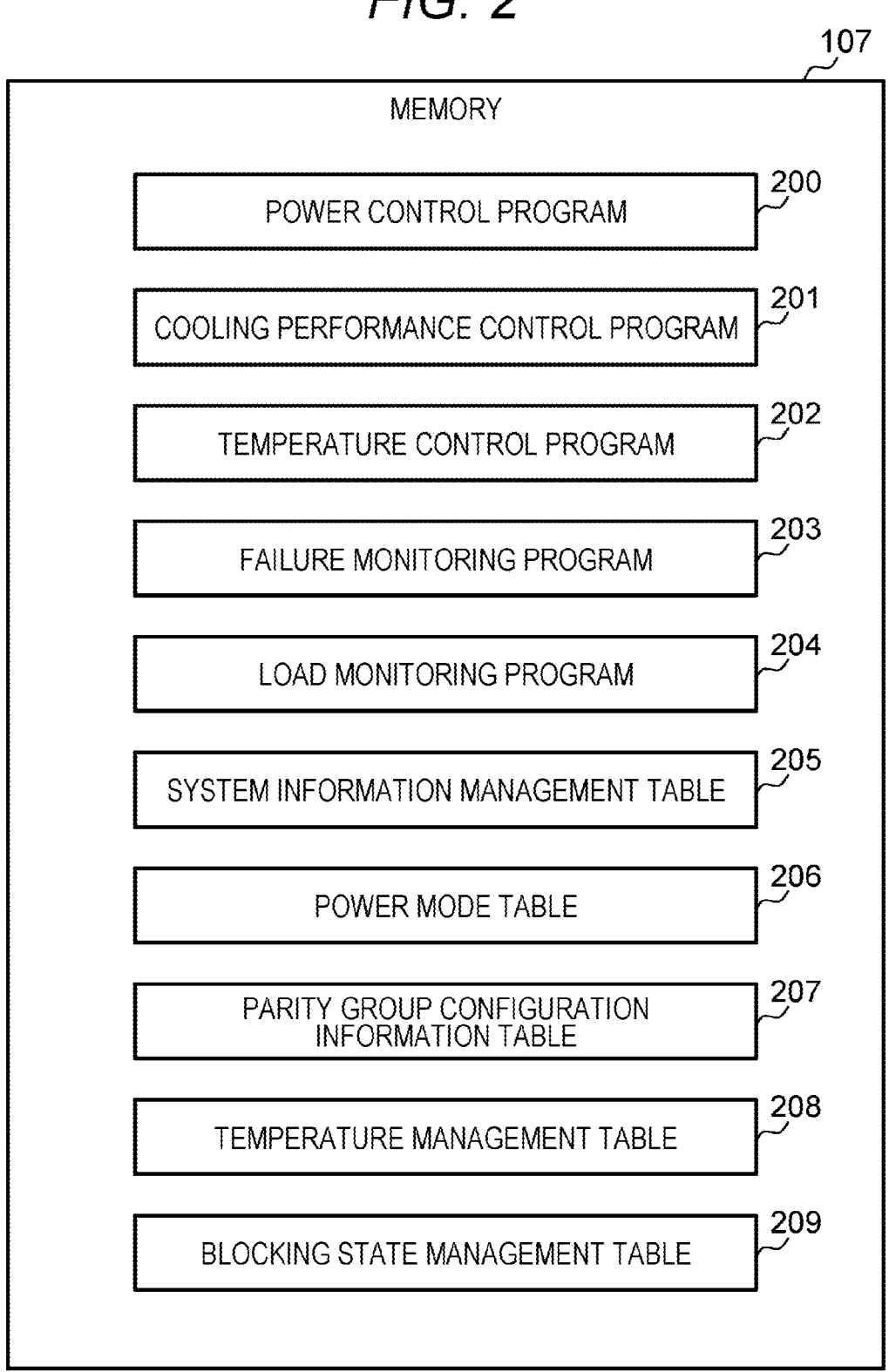
FIG. 2 is a view illustrating an example of a program and information that are stored in a memory of a controller in FIG. 1.

FIG. 2 is a view illustrating an example of a program and information that are stored in the memory 107 of the controller 104 in FIG. 1. For example, the memory 107 includes a power control program 200, a cooling performance control program 201, a temperature control program 202, a failure monitoring program 203, and a load monitoring program 204 as control programs.

The memory 107 includes a system information management table 205, a power mode table 206, a parity group configuration information table 207, a temperature management table 208, and a blocking state management table 209 as information used by the control program described above. The memory 107 may have other information such as a control program and control data.

For example, the power control program 200 optimizes the power and performance of the storage system 100 according to a blocking state or a load bias in conjunction with the cooling performance control program 201.

As described above, the storage system 100 of the first embodiment includes the plurality of controllers 104, and the plurality of controllers 104 include the CPU 108 as an example of a component in which the performance can be changed by changing the supplied power and the power control program 200 that controls the power consumption of the CPU 108. The component may be other than the CPU 108 described above. In the case where one controller 104 among the plurality of controllers 104 is blocked, the power control program 200 supplies as much power as possible to the CPU 108 of the other normal controller 104 as a handover destination of the processing executed by the blocked one controller 104.

In other words, the storage system 100 of the first embodiment includes a plurality of storage drives 115 that provides a storage capacity of data and a plurality of storage controllers 104 that execute write or read processing of data with the storage drives 115. Each of these controllers 104 includes a component (including at least a CPU) capable of changing performance by changing an amount of supplied power, and a memory 107 storing the power control program 200 controlling a target value of the power consumption of the component 108. When the power control program 200 is executed by the CPU 108, in response to detection of a blocked controller among the plurality of controllers 104, a function of raising the target value of the power consumption for a component (for example, the CPU 108) included in the controller 104 is executed in the normal controller 104 (that is, the other normal controller 104 as the handover destination of the processing executed by the one controller 104 that is blocked) configuring a redundant system with respect to the controller 104 that causes the blocking. The detection of the blocked controller may be implemented by a program different from the power control program 200.

The power control program 200 monitors the load of the CPU 108 of the one controller 104 while the one controller 104 is not blocked, and in the case where a part of the CPUs 108 having a high load is detected in the one controller 104, the power control program 200 supplies the power as much power as possible to the part of the CPUs 108 having the high load instead of limiting the power and the performance that are supplied to the other CPUs 108 having no problem even when the performance is degraded. In other words, when the power control program 200 is executed by the CPU 108, the plurality of controllers 104 monitor the loads of the component (for example, the CPU 108) included in each of the plurality of controllers 104. When the controller 104 having the component exceeding the predetermined load standard is detected, the function of raising the target value of the power consumption for the component exceeding the standard regarding the load in the controller 104 and lowering the target value of the power consumption and the performance of the other components when the component falling below the predetermined load standard for the other components exists is executed.

The power control program 200 restores the power and performance supplied to the CPU 108 of one controller 104 to the original state after the blocking of the one controller 104 or the high load of the part of the CPUs 108 is eliminated. In other words, when the power control program 200 is executed by the CPU 108, a function of lowering the target value of the power consumption for the recovered controller 104 and the controller 104 configuring the redundant system is executed in response to the recovery of the blocked controller 104. In addition, the target value of the power consumption is set again for the recovered controller 104. In addition, when the power control program 200 is executed by the CPU 108, in response to the load of the component (for example, the CPU 108) in which the target value of the power consumption is raised falling below the predetermined standard, the function of lowering the target value of the power consumption and the performance for the component is executed.

As described above, the storage system 100 of the first embodiment includes the FAN 112 that cools the controller 104 and the cooling performance control program 201 that controls the cooling performance of the FAN 112. When receiving an instruction to change the cooling performance from the power control program 200 or the temperature control program 202, the cooling performance control program 201 controls the power supply unit 109 and the FAN 109 to change the cooling performance. More specifically, the cooling performance control program 201 enhances the cooling performance of the FAN 112 in conjunction with changing the power supplied to the CPU 108 of the other controller 104 or a part of the CPUs 108 having the high load in increasing the power supplied to the CPU 108 of the other controller 104 or the part of the CPUs 108 having the high load in accordance with the blocking of the one controller 104 by the power control program 200, or the cooling performance control program 201 restricts the power supplied to the one controller 104 when the margin enhancing the cooling performance of the FAN 112 does not exist. In other words, the storage system 100 of the first embodiment includes the cooling device (FAN 112) that cools each controller 104 and the cooling performance control program 201 that is stored in the memory 107 and controls the cooling performance of the FAN 112, and when the cooling performance control program 201 is executed by the CPU 108, the function of raising the output of the FAN 112 provided to the controller 104 in which the target value of the power consumption is raised or the controller 104 including the component in which the target value of the power consumption is raised is executed. Furthermore, when the cooling performance control program 201 is executed by the CPU 108, the function of monitoring the output of the FAB 112 and the function of lowering the target value of the power consumption set for the controller 104 in which the detected FAN 112 is provided when it is detected that the output of the FAN 112 reaches a predetermined standard by the monitoring function are executed.

The storage system 100 of the first embodiment includes the FAN 112 that cools the controller 104 and the cooling performance control program 201 that controls the FAN 112. The cooling performance control program 201 restores the cooling performance of the FAN 112 to the original state in conjunction with the restoration of the performance and the power supplied to the CPU 108 of one controller 104. In other words, when the cooling performance control program 201 is executed by the CPU 108, the function of lowering the output of the FAN 112 provided for the controller 104 is executed in response to the detection of the controller 104 in which the target value of the power consumption is lowered or the controller 104 including the component in which the target value of the power consumption is lowered.

The temperature control program 202 periodically monitors the temperature of the system, and records the temperature status in the temperature management table 208. The temperature control program 202 sends a cooling performance change instruction to the cooling performance control program 201 when the temperature of each component is likely to reach the threshold. For example, the threshold here is a temperature set with the margin with respect to a limit temperature that leads to failure generation of the device.

The storage system 100 of the first embodiment includes the node 103 including the plurality of controllers 104. The power control program 200 preferentially selects the controller 104 having a margin in the power supply and load from among the plurality of controllers 104 as a processing takeover destination when one controller 104 is blocked and takes over the processing, and selects the other normal controller 104 belonging to the same node 103 as the one controller 104 that is blocked when all the plurality of controllers 104 do not have the margin in the power supply and the load. In other words, the storage system 100 is a system including a plurality of nodes 103 including the plurality of controllers 104, and when the power control program 200 is executed by the CPU 108, the function of allocating the controller 104 in which the target value of the power consumption can be raised and in which the load falls below a predetermined standard from among the controllers 104 included in any one of the nodes 103 is executed as the normal controller 104 configuring the redundant system with the blocked controller 104. Alternatively, when the power control program 200 is executed by the CPU 108, the function of allocating the normal controller 104 included in the same node 103 as the blocked controller 104 is executed as the normal controller 104 configuring the redundant system with the blocked controller 104 when it is detected that the target value of the power consumption reaches the upper limit that can be raised or the load reaches the predetermined standard in the controllers included in any node.

The storage system 100 of the first embodiment includes the plurality of drives 115 in which performance can be changed by changing the supplied power. When a part of the plurality of drives 115 is blocked, the power control program 200 supplies as much power as possible to another drive 115 having the high load, or when a part of the plurality of drives 115 having the high load is detected, the power control program 200 supplies as much power as possible to a part of the drives 115 having the high load instead of limiting the power supplied to another drive 115 having no problem even when the performance is degraded and the performance. In other words, the power control program 200 is a power control program that further controls the target value of the power consumption of the storage drive 115, and when the blocked drive 115 is detected among the plurality of storage drives 115 by executing the power control program by the CPU 108, the function of raising the target value of the power consumption for at least one other storage drive is executed. In addition, when the power control program 200 is executed by the CPU 108, and when the storage drive 115 exceeding a predetermined load standard is further detected among the plurality of storage drives 115, the function of raising the target value of the power consumption for the storage drive 115 exceeding the standard and lowering the target value of the power consumption for the other storage drives 115, namely, the storage drives 115 falling below the predetermined load standard and the performance is executed. This makes it possible to appropriately cope with an increase in load. The blocking monitoring of the storage drive 115 may be implemented by a program different from the power control program.

The storage system 100 of the first embodiment includes FANS 112p to 112z (hereinafter also collectively referred to as "FAN 112") as an example of a cooling mechanism capable of cooling the drive 115, and the cooling performance control program 201 that controls the cooling performance of the FAN 112. The cooling performance control program 201 limits the power supplied to a part of the drives 115 in the case where the margin to enhance the cooling performance of the FAN 112 exists or the margin to enhance the cooling performance of the FAN 112 does not exist in conjunction with the change of the power supplied to the drives 115 by the power control program 200. In other words, the storage system 100 of the first embodiment includes the cooling mechanism (FAN 112) capable of cooling the storage drive 115 and the cooling performance control program 201 that is stored in the memory 107 to control the output of the FAN 112, and when the cooling performance control program 201 is executed by the CPU 108, the function of raising the output of the FAN 112 provided for the storage drive 115 in which the target value of the power consumption is raised is executed. When the cooling performance control program 201 is executed by the CPU 108, the function of monitoring the output of the FAN 112 and the function of lowering the target value of the power consumption set for the storage drive 115 in which the detected FAN 112 is provided when it is detected that the output of the FAN 112 reaches a predetermined standard by the monitoring function are further executed.

The power control program 200 restores the power and performance of a part of the drives 115 or other drives 115 to the original state after the blocked part of the drives 115 among the plurality of drives 115 is recovered or the high load of other drives 115 is eliminated. In other words, when the recovery of the blocked storage drive 115 is detected by executing the power control program 200 by the CPU 108, the function of lowering the target value of the power consumption with respect to the storage drive 115 in which the target value of the power consumption is raised according to the blocking of the storage drive 115 among the plurality of storage drives 115 is executed. In addition, the target value of the power consumption is set again for the recovered storage drive 115. In addition, when the load is below the predetermined standard of the load for the storage drive 115 in which the target value of the power consumption is raised in response to exceeding the predetermined standard of the load, the function of lowering the target value of the power consumption of the storage drive 115 and the performance is executed.

As described above, the storage system 100 of the first embodiment includes the FAN 112 as an example of the cooling mechanism capable of cooling the drive 115, and the cooling performance control program 201 that controls the cooling performance of the FAN 112. The cooling performance control program 201 restores the cooling performance of the FAN 112 to the original state in conjunction with the restoration of the power and performance of the drive 115 by the power control program 200. In other words, when the cooling performance control program 201 is executed by the CPU 108, the function of lowering the output of the FAN 112 provided for the storage drive 115 is executed in response to the detection of the storage drive 115 in which the target value of the power consumption is lowered.

On the other hand, the failure monitoring program 203 periodically monitors and adds up the failure count of each component to monitor the generation status of the failure blocking. In addition, the failure monitoring program 203 also monitors a sign of the failure blocking, and immediately sends a response instruction in generating the failure blocking or in predicting the generation of the failure blocking.

The load monitoring program 204 monitors the load on each component of the storage system 100, and records the load status in the system information management table 205.

For example, the load at this time is the load of the CPU 108 for the controller 104, and the load during I/O processing for the drive 115.

FIG. 3 is a view illustrating an example of the system information management table 205 in FIG. 2. The system information management table 205 stores information about the components mounted on the storage system 100.

The system information management table 205 manages a mounting position, device identification information, a state, power consumption, a load, and a power mode of each component (device). In the first embodiment, " . . . row" indicates an entry of the row corresponding to " . . . " in data in a table format, and for example, "power mode row" indicates the entry of the row "power mode" in the system information management table 205.

For example, in the FE I/F 105, the BE I/F 111, the CPU 108, and the memory 107 that are mounted on the controller 104, the mounting positions of the components mounted on the controller #0 (in the first embodiment, "#" indicates an identification number) are all indicated as mounting positions "0". For other components, the mounting positions are also managed as continuous numbers based on the actual component configuration.

The device identification information is information used to determine which component is on a control program side. The state is displayed as "active" in the case of operating, and is displayed as "inactive" in the case of not operating normally for some reason such as at the time of the failure generation or a spare. A power consumption row indicates how much power is currently consumed by which component.

For example, each component in the controller 104 is power consumption that can be acquired by the environmental MIC 110, and is a numerical value different from the rated power consumption. However, for the power supply unit, for example, power supplied from an outlet or the like is indicated instead of actually consumed power. That is, the power consumption row of the power supply unit records the maximum power available to the controller.

In a load row, how much processing load is currently applied to each component is recorded by the load monitoring program 204. The power mode row is information managed by the power mode table 206, and is an index indicating magnitude of the supply power and operation performance.

FIG. 4 is a view illustrating an example of the power mode table 206 in FIG. 2. The power mode table 206 manages a power mode of a component (device) mounted on the storage system 100.

The power mode table 206 manages a mounted device, the power mode, the power consumption, and a processing capability. A mounted device row corresponds to a device information row illustrated in the system information management table 205. In the power mode, "0" indicates a state in which the supply power is the highest, and "3" indicates a state in which the supply power is the lowest. The power consumption indicates power consumed in each power mode, and corresponds to the target value or the upper limit value of consumable power set for each device. For this reason, the change of the power mode corresponds to raising or lowering the target value or the upper limit value of the consumable power set for each device. The processing capability indicates how much performance is exhibited in the case where the operation is performed with the power consumption corresponding to each power mode.

In the first embodiment, depending on the component (device), a difference in the number of corresponding power modes or the component that does not have the plurality of power modes may be included. In the first embodiment, there are two items of the power consumption and the processing capability, but for example, other information required for selecting the power mode, such as restrictions (limited functions) when the power mode is used, may be included.

Figure 5:
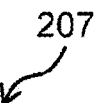
FIG. 5 is a view illustrating an example of the parity group configuration information table in FIG. 2.

FIG. 5 is a view illustrating an example of the parity group configuration information table 207 in FIG. 2. The parity group configuration information table 207 manages parity group information about the plurality of drives 115. That is, the parity group configuration information table 207 manages which drive 115 mounted on the drive box 113 and which drive 115 configure the parity group. "SPARE" of the parity group indicates that it is unused.

FIG. 6A is a view illustrating an example of the temperature management table 208 in FIG. 2. The temperature management table 208 manages temperature information related to the controller 104 and the drive 115. The temperature management table 208 manages the mounted device, the mounting position, the device identification information, a current temperature, a temperature threshold (with a margin), and a temperature threshold (limit value).

The mounting position and the device identification information in the temperature management table 208 are similar to those in the system information management table 205 described above. The current temperature indicates a temperature acquired from the environmental MIC 110 in the case of the controller 104, and indicates a temperature acquired from the temperature sensor 116 in the case of the drive 115.

The temperature threshold (limit value) indicates a temperature threshold (limit value) at which the failure generation is considered. The temperature threshold (with margin) row indicates a value with a margin with respect to the temperature threshold (limit value) of the limit at which the failure generation is considered. In the first embodiment, it is assumed that the margin is, for example, about 70%, but it is assumed that the margin is actually close to the temperature at which an alert is issued in the storage system 100.

FIG. 6B is a view illustrating an example of the blocking state management table 209 in FIG. 2. The blocking state management table 209 manages the blocking states of the controller 104 and the drive 115. The blocking state management table 209 manages the mounted device, the mounting position, the device identification information, the failure count, and the blocking state.

In the blocking state management table 209, the mounting position and the device identification information are similar to those in the system information management table 205. The failure count is a variable used by the control program to determine whether the failure is generated. When the failure count exceeds a certain threshold, it is determined that the failure is generated. In the case where the failure count exceeds the threshold, it is determined that the failure is generated, and the failure is recorded as the failure blocking in a blocking state row. The processing is performed by the failure monitoring program 203 in the control program. In addition, regardless of the failure count, also in the case where the failure is already generated to establish the blocking state, or in the case where the sign of the failure blocking is detected, the blocking state row is similarly updated to the failure blocking. In addition, a maintenance block is also prepared as the state other than the failure blocking. In the case where it is not in either blocking state, the blocking state row indicates normal.

Figure 7:
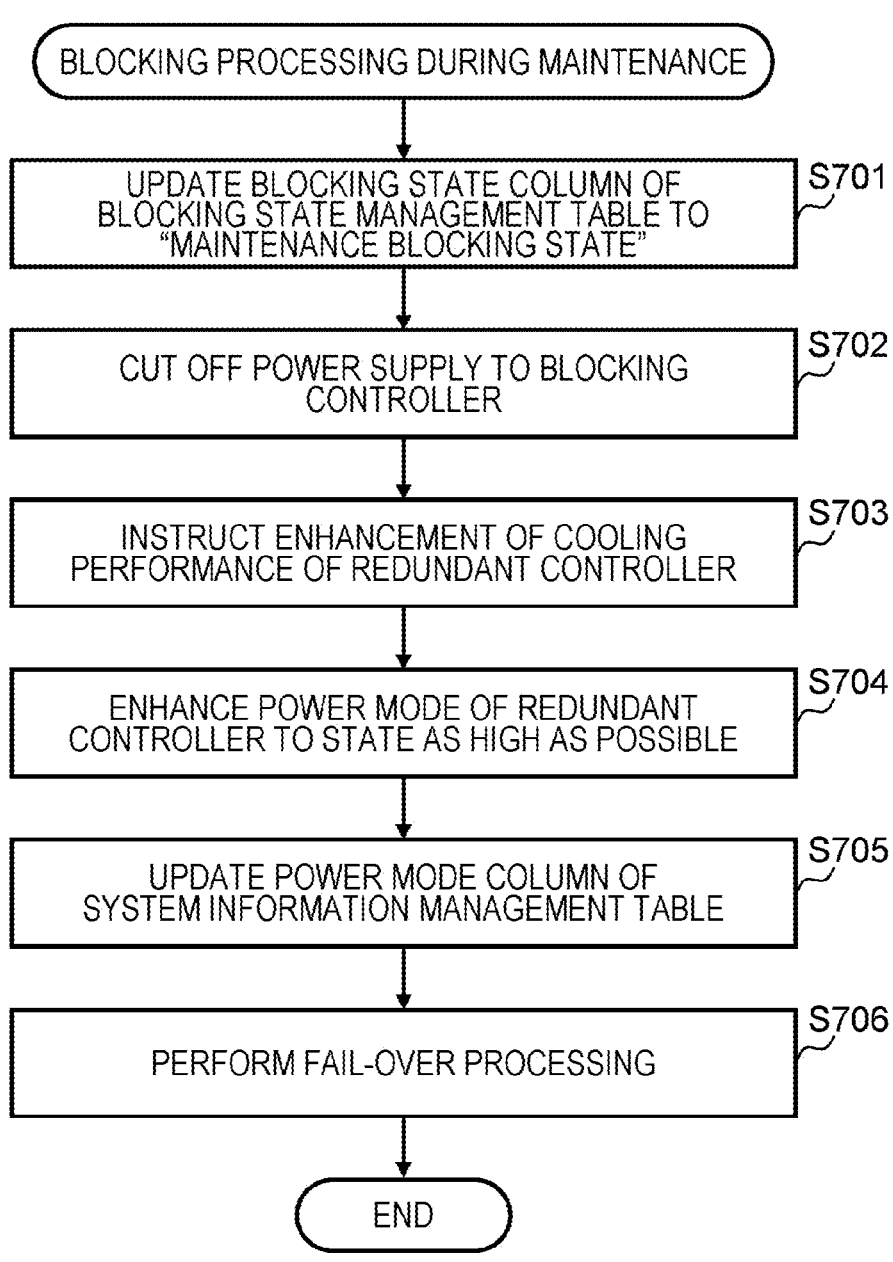
FIG. 7 is a flowchart illustrating an example of a procedure of blocking processing during maintenance.

FIG. 7 is a flowchart illustrating an example of a procedure of the blocking processing during the maintenance. The blocking processing during the maintenance is processing of blocking a part of the controller 104 in the node 103 along with the maintenance blocking work, and is executed by the power control program 200.

At this point, for example, the maintenance blocking work refers to work performed by logically cutting off connection to one controller 104 or work such as cutoff of supply power to the controller and reconnection of connection in order to perform replacement processing of the controller. For this reason, during the maintenance blocking operation, the storage system 100 in FIG. 1 operates with the of configuration the single controller 104.

In the first embodiment, the controller to be blocked is also referred to as a "blocked controller", and the normal controller belonging to the same node as the blocked controller is also referred to as a "redundant controller".

First, the power control program 200 reads the blocking state management table 209 from the memory 107, and updates the block state row of the controller 104 scheduled to perform the maintenance blocking work to the "maintenance blocking state" (step S701). Thereafter, a person in charge who performs the maintenance blocking work, namely, a maintenance worker cuts off the power supply to the blocked controller (step S702). However, in the case where it is not necessary to cut off the power supply due to the maintenance blocking work, the power supply may not be cut off.

The power control program 200 calls the cooling performance control program 201 to enhance the cooling performance corresponding to the redundant controller 104 belonging to the same node 103 as the blocked controller 104 (step S703). This is a countermeasure against the generation of heat along with the improvement of the processing performance of the redundant controller 104, and is performed by the power control program 200 instructing the cooling performance control program 201. Details of the cooling performance enhancement processing will be described later.

The power control program 200 sets the state as high as possible, for example, the power mode "0" or "1" to the CPU 108 of the redundant controller 104 that performs fail-over processing (step S704).

The power mode "0" is a mode in which the operation performance is enhanced such that the processing capacity is maximized, and accordingly, the power consumption is allowed to be maximized. In the case where the power consumption is increased with respect to the CPU 108, the power control program 200 increases an operation frequency to the maximum to improve the performance.

The number of cores configuring the CPU 108 may be increased as means for improving the operation performance of the CPU 108. In addition, in the case where the read and write processing of the memory 107 increases in accordance with the improvement in the operation performance of the CPU 108, the power supplied to the memory 107 may also be increased. Similarly, in the case where an amount of communication with the host terminal 101 and the drive 115 increases in accordance with the improvement in the operation performance of the CPU 108, the supply power of the FE I/F 105 and the BE I/F 111 may also be increased.

On the other hand, the power mode "1" is a mode in which the power is supplied such that the processing capability can be exhibited up to about 80%. The power mode of the component described above is determined with reference to the load recorded in the system information management table 205 and the processing capability of the power mode table 206. In the case where the component in which the power mode is changed exists, the power control program 200 updates the power mode row of the system information management table 205 to the power mode during the recording.

After the change of the power mode, fail-over processing when the controller 104 is blocked is performed (step S705). The fail-over processing is processing for handing over the processing of one controller 104 to the normal other controller 104 in blocking one controller 104. Because only one controller exists in the state where the one controller 104 is blocked, there is a possibility that the processing performance is simply halved as it is.

On the other hand, in the first embodiment, the power control program 200 improves the operation performance of the redundant controller 104 that performs the fail-over processing, thereby making it possible to improve the performance in the state where only one controller exists. For this reason, an operation power mode of the redundant controller 104 is maintained at "0" or "1" as long as only the redundant controller 104 continues to operate even after the execution of the fail-over processing in addition to maintaining the power mode at the maximum during the execution of the fail-over processing, thereby maintaining the operating performance in a state where there is only one controller in a high state.

FIG. 8 is a flowchart illustrating an example of a procedure of sudden blocking processing. The sudden blocking processing is processing when a sudden failure is generated in one of the controllers 104 to become the blocking state through the work during failure blocking. At this point, for example, an example of the event in which the sudden failure is generated to become the blocking includes a situation in which communication with the device is suddenly cut off during the operation of the storage system 100, such as the breakdown of the device. The event in which the sudden failure is generated to become the blocking may be caused by a cause other than the above-described example. The work during failure blocking is executed by the power control program 200.

The power control program 200 first refers to the blocking state management table 209 to check the blocking state of the controller 104 (step S801). Subsequently, the power control program 200 determines whether the controller in the blocking state is only one controller 104 among the plurality of controllers 104 in the node 103 (whether the controllers are both controllers 104) or whether the blocked controller 104 does not exist (step S802). When it is determined that the blocked controller 104 does not exist or when both controllers are blocked, the power control program 200 ends the sudden blocking processing.

On the other hand, when only one of the controllers 104 is blocked, the power control program 200 shifts to the power mode switching processing (step S803). In the power mode switching processing, the power control program 200 first calculates the power that can be additionally supplied to the redundant controller 104 (step S803).

In the processing of calculating the suppliable power, the power control program 200 first refers to the system information management table 205 to acquire the power consumption of the redundant controller 104. In addition, the power control program 200 checks the current supply power recorded in the power consumption row of the power supply unit 109, and also acquires the maximum power that can be supplied to the redundant controller 104.

Subsequently, the power control program 200 refers to the power mode table 206 to calculate the power consumption in consideration of the raised power mode of the controller 104 (step S804). The power control program 200 compares the calculated power consumption with the power that can be additionally supplied to the redundant controller 104, and determines whether the power mode can be raised (step S805). The power control program 200 executes step S806 when determining that the power mode can be increased, and the power control program 200 executes the fail-over processing without changing the power mode when determining that the power mode cannot be raised (step S810).

The power control program 200 calls the cooling performance control program 201 to enhance the cooling performance corresponding to the redundant system controller in the same node 103 as the block controller 104 (step S806). This is countermeasure against the generation of heat as the processing performance is improved. Details of this processing will be described later.

The power control program 200 changes the setting of the maximum power mode obtained by the calculation (for example, the power mode "0") to the CPU 108 of the redundant system controller 104 that performs the fail-over processing (step S807).

In the first embodiment, in the case where the read and write processing of the memory 107 increases in accordance with the improvement in the operation performance of the CPU 108, the power supplied to the memory 107 may also be increased. Similarly, in the case where the amount of communication with the host terminal 101 and the drive 115 increases in accordance with the improvement in the operation performance of the CPU 108, the supply power of the FE I/F 105 and the BE I/F 111 may also be increased. In the case where the component in which the power mode is changed exists, the power mode row of the system information management table 205 is updated to the power mode during the recording.

The power control program 200 performs the fail-over processing when the controller 104 is blocked (step S810). The fail-over processing is processing of taking over the processing executed by one controller 104 to the normal redundant controller 104 in blocking the one controller 104. In the state where one controller 104 is blocked, there is only one controller, and thus there is a possibility that simple processing performance is halved as it is. In addition, because the redundant path does not exist due to the system configuration, there is a possibility that failure tolerance is degraded as it is.

For these two problems, the power control program 200 improves the operation performance of the normal redundant controller 104 that performs the fail-over processing, thereby improving the performance of the entire storage system in the state where only one controller exists, and the power control program 200 quickly completes the blocking work, thereby reducing the risk related to the failure tolerance. For this reason, in the first embodiment, the operation power mode of the redundant controller 104 is maintained in the state of "0" or "1" as long as only the redundant controller 104 continues to operate even after the execution of the fail-over processing in addition to the maintenance of the power mode at the maximum during the execution of the fail-over processing, and the operating performance in the state where only one controller exists is maintained in the high state.

Figure 9:
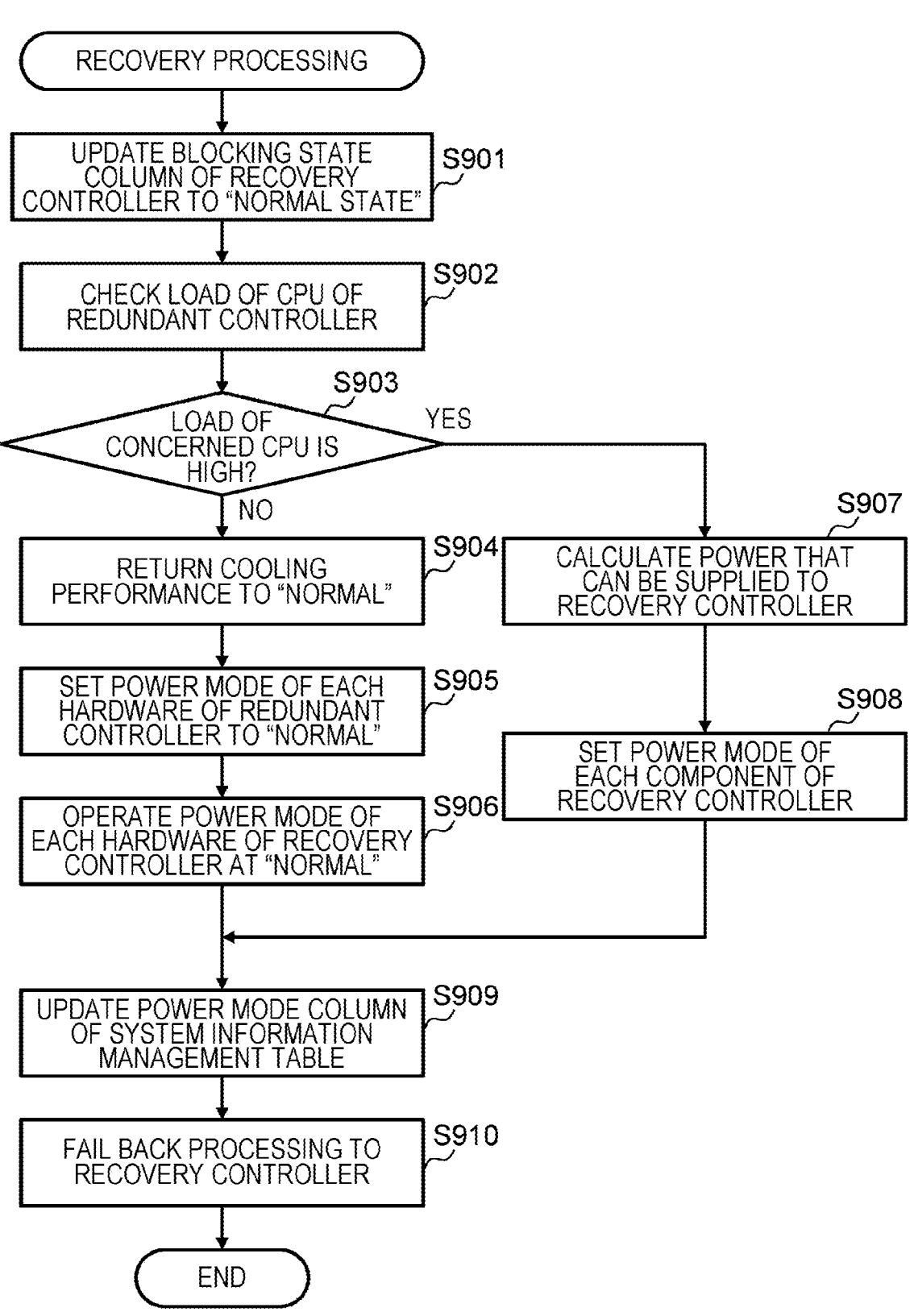
FIG. 9 is a flowchart illustrating an example of a procedure of recovery processing.

FIG. 9 is a flowchart illustrating an example of a procedure of recovery processing. The recovery processing is processing of recovering the blocking state of the blocking controller 104. At this point, the recovery refers to an operation in which the processing during the blocking is completed to bring the blocked controller 104 into a normally usable state.

This recovery processing indicates a flow until processing that failed over to the redundant controller 104 before the above-described blocking processing fails back to the recovered one controller 104. The recovery processing is executed by the power control program 200. The recovery processing may be automatically performed after the maintenance worker finishes physical replacement of the controller 104, or may be activated by an external input according to the instruction of the maintenance worker.

First, the power control program 200 updates the blocking state row of the one controller 104 in the blocking state management table 209 to "normal state" (step S901). Thereafter, the power control program 200 refers to the system information management table 205, checks the load status of the CPU 108 in the redundant system controller 104 (step S902), and determines whether the load is high state with respect to a predetermined standard (step S903). The standard for determining the high load state, namely, the high load state in step S903 is the state in which the load of the CPU 108 is equal to or greater than 80%, for example.

The power control program 200 executes step S904 when the CPU load in the controller 104 of the redundant system is less than 80%, and executes step S907 when the load of the CPU is equal to or greater than 80%. Even in the case where the load of the CPU is less than 80%, step S907 may be executed in the case where the processing is expected to increase in the future.

In steps S904 to S906, processing of returning the power mode pulled up during the blocking to the normal (state) is performed. First, the power control program 200 calls the cooling performance control program 201 to return the cooling performance of the FAN 112 of the redundant controller 104 to normal (step S904).

Subsequently, the power control program 200 returns the power modes of the CPU 108, the memory 107, the FE I/F 105, and the BE I/F 111 of the redundant controller to normal (step S905). The power control program 200 operates the power mode of each component of the controller 104 to be recovered at "normal" (step S906).

At this point, "normal" indicated in steps S904, S905, S906 is the state in which the appropriate power mode is set for the current processing load. For example, in the case where the current processing load is 40% and the CPU 108 in which the power mode is "1" exists, because the processable performance is 80%, it is considered that the operation performance is high with respect to the actual processing load.

In this case, even in the case where the power mode of the CPU 108 is lowered to "2", it is considered that the current processing can be sufficiently completed, and thus the power mode is lowered to "2". However, for example, in the case where the supply power of the CPU 108 is lowered, sometimes the processing load is relatively increased due to degradation of the operation performance, and thus the power mode is lowered one by one. When the power mode is set to the minimum necessary power mode in this processing, surplus power for improving the performance during the blocking is obtained.

In steps S907 to S908, the power control program 200 starts the operation of the controller 104 to be recovered in the state where the power mode of the redundant controller 104 is maintained high. First, the power control program 200 refers to the system information management table 205 and calculates the power that can be supplied to the recovery controller 104 (step S907). Thereafter, the power control program 200 sets the minimum necessary power mode that can be set for each component of the recovery controller 104 based on the suppliable power obtained by the calculation, and causes the components to operate (step S908).

In the case where the component in which the power mode is changed exists in the recovery processing of the controller 104, the power control program 200 updates the power mode row of the system information management table 205 to the power mode during the recording (step S909).

The power control program 200 fails back the processing of the redundant controller 104 to the recovered controller 104 (step S910).

Figure 10:
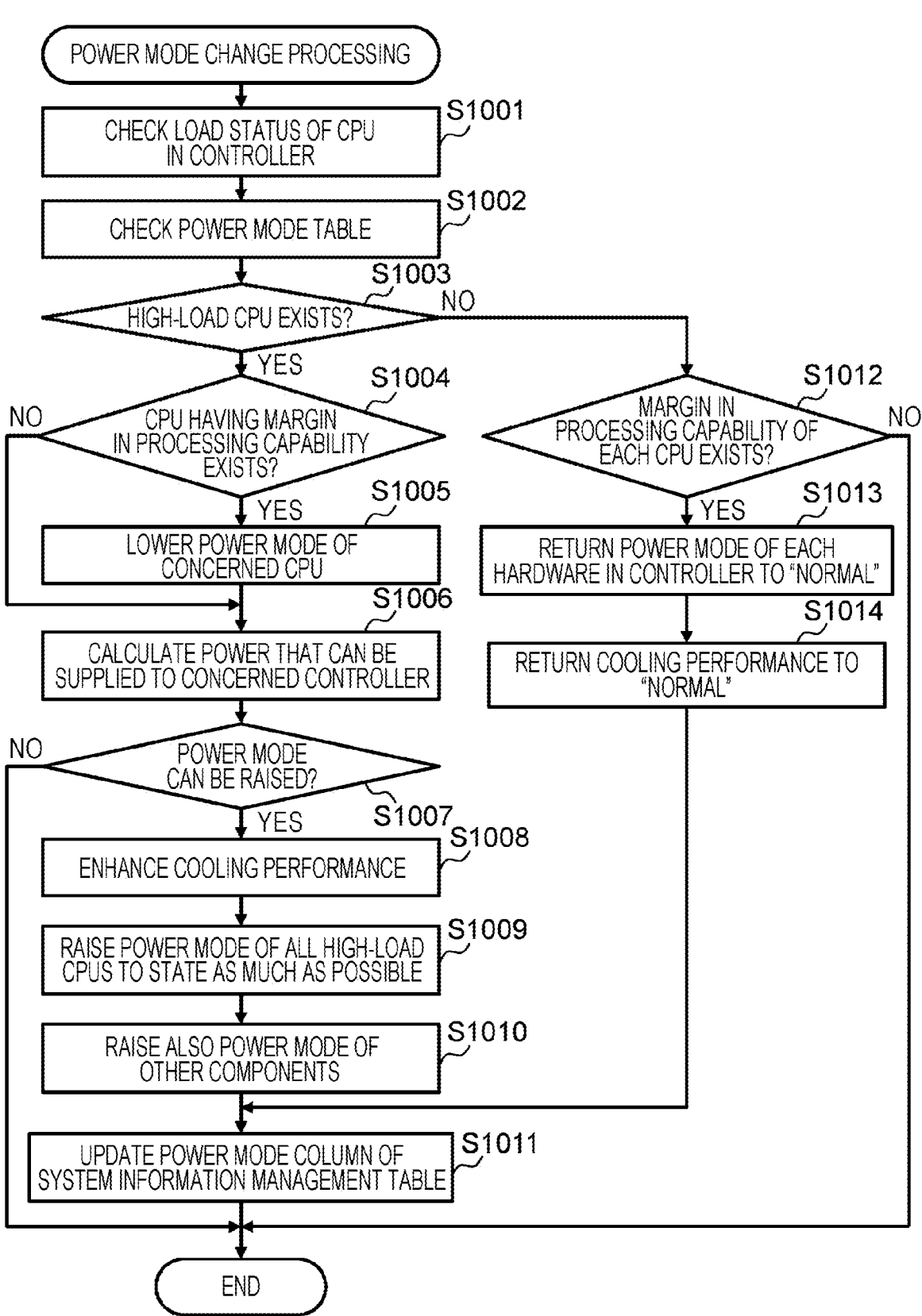
FIG. 10 is a flowchart illustrating an example of a procedure of power mode change processing.

FIG. 10 is a flowchart illustrating an example of a procedure of power mode change processing. The power mode change processing is processing of changing the power mode in the case where the load of the CPU 108 of the controller 104 is higher than a predetermined standard. The power mode change processing is executed by the power control program 200.

First, the power control program 200 refers to the system information management table 205 to check the load status of the CPU 108 in the controller 104 (step S1001). Thereafter, the power control program 200 refers to the power mode table 206 to acquire the information about the power mode (step S1002). In step S1003, the power control program 200 determines whether the high-load CPU 108 exists in the controller 104 (step S1003).

The power control program 200 executes step S1004 when the high-load CPU 108 exists, and the power control program 200 executes step S1013 when the high-load CPU 108 does not exist. The standard for determining the high-load state, namely, the high-load state in step S1002 is the state in which the load of the CPU 108 is equal to or more than, for example, 80%.

The power mode switching processing in the case where only the CPU 108 of one of the controllers 104 among the CPUs 108 stored in the controller 104 in the node 103 has the high load will be described in steps S1004 to S1006.

The power control program 200 determines whether the margin exists in the power mode of the low-load CPU 108, namely, the CPU 108 not satisfying the standard for determining the high load state based on the load information about the CPU 108 acquired in step S1001 and the information about the power mode acquired in step S1002 (step S1004).

The power control program 200 executes step S1005 when determining that the margin exists, and executes step S1006 when not determining that the margin does not exist. In the first embodiment, for example, the standard for determining that the margin exists is the case where the power mode in which the current processing load can be achieved at the minimum is lower than the current power mode. That is, for example, in the case where the current processing load is 40% and the CPU 108 in which the power mode is 1 exists, because the processable performance is 80%, it is considered that the operation performance is high with respect to the actual processing load. In this case, even in the case where the power mode of the CPU 108 is lowered to "2", it is considered that the current processing can be sufficiently completed, and thus the power mode is lowered to "2".

In step S1005, the power control program 200 lowers the power mode of the low-load CPU 108. However, for example, in the case where the supply power of the CPU 108 is lowered, sometimes the processing load is relatively increased due to degradation of the operation performance, and thus the power mode is lowered one by one.

In step S1006, the power control program 200 calculates the power that can be supplied to each component of the controller 104. For this calculation, the load status of the CPU 108 in the system information management table 205 acquired in step S1001 is used. The power control program 200 calculates the difference between the maximum power that can be supplied to the power supply unit and a total of the power consumption obtained by calculating a summation of the power consumption of the operating components to obtain the surplus power that can be supplied to the controller 104.

The power control program 200 determines whether the power mode of the high-load CPU 108 can be raised based on the obtained surplus power (step S1007). In this determination, the power control program 200 refers to the power mode table 206 to compare whether an increment in the power consumption accompanying the raise in the power mode falls within the range in which the surplus power can be supplied. The power control program 200 executes step S1008 when the power mode can be raised, and the power control program 200 ends the power mode change processing when it is difficult to raise the power mode.

In steps S1008 to S1011, the power control program 200 raises the power mode of the high-load CPU 108. First, the power control program 200 calls the cooling performance control program 201 to enhance the cooling performance of the FAN 112 of the controller 104 (step S1008). Subsequently, the power control program 200 raises the power mode of the high-load CPU 108 to the state as high as possible (step S1009). The power mode at this time is determined based on the calculated surplus power.

After the power mode of the CPU 108 is raised, in the case where another component in the controller 104 that requires high performance along with the improvement in the performance of the CPU exists, power mode raising processing of the component is also performed (step S1010). The power control program 200 updates the power mode row of the system information management table 205 (step S1011), and ends the power mode change processing. It is assumed that the component updating the power mode row raises the power mode in steps S1008, S1009, S1010. In each processing from step S1008 to step S1011, in the case where the plurality of high-load CPUs 108 exist, the same processing is performed for the plurality of CPUs.

Steps S1012 to S1014 are processing executed when the determination in step S1002 is negative, and illustrate the case where neither the blocked component of the controller 104 nor the high-load CPU 108 exists. First, in step S1012, the power control program 200 determines whether the margin exists in the processing capability of each CPU 108. This determination is similar to the content performed in step S1004. When it is determined in step S1012 that the margin exists, the power control program 200 executes step S1013, and when it is not determined that the margin exists, the power control program 200 ends the power mode change processing.

In step S1013, the power control program 200 returns the power mode of each component in the controller 104 to "normal". "Normal" is the state in which the appropriate power mode is set for the current processing load. The power mode lowering processing of this processing is similar to step S1006. When it is assumed that the processing load increases in the future or the processing load increases due to the lowering of the power mode, the execution of the processing shall not be required. After returning the power mode of each component, the power control program 200 also returns the power mode of the FAN 112 to normal by the cooling performance control program 201 (step S1014).

Figure 11:
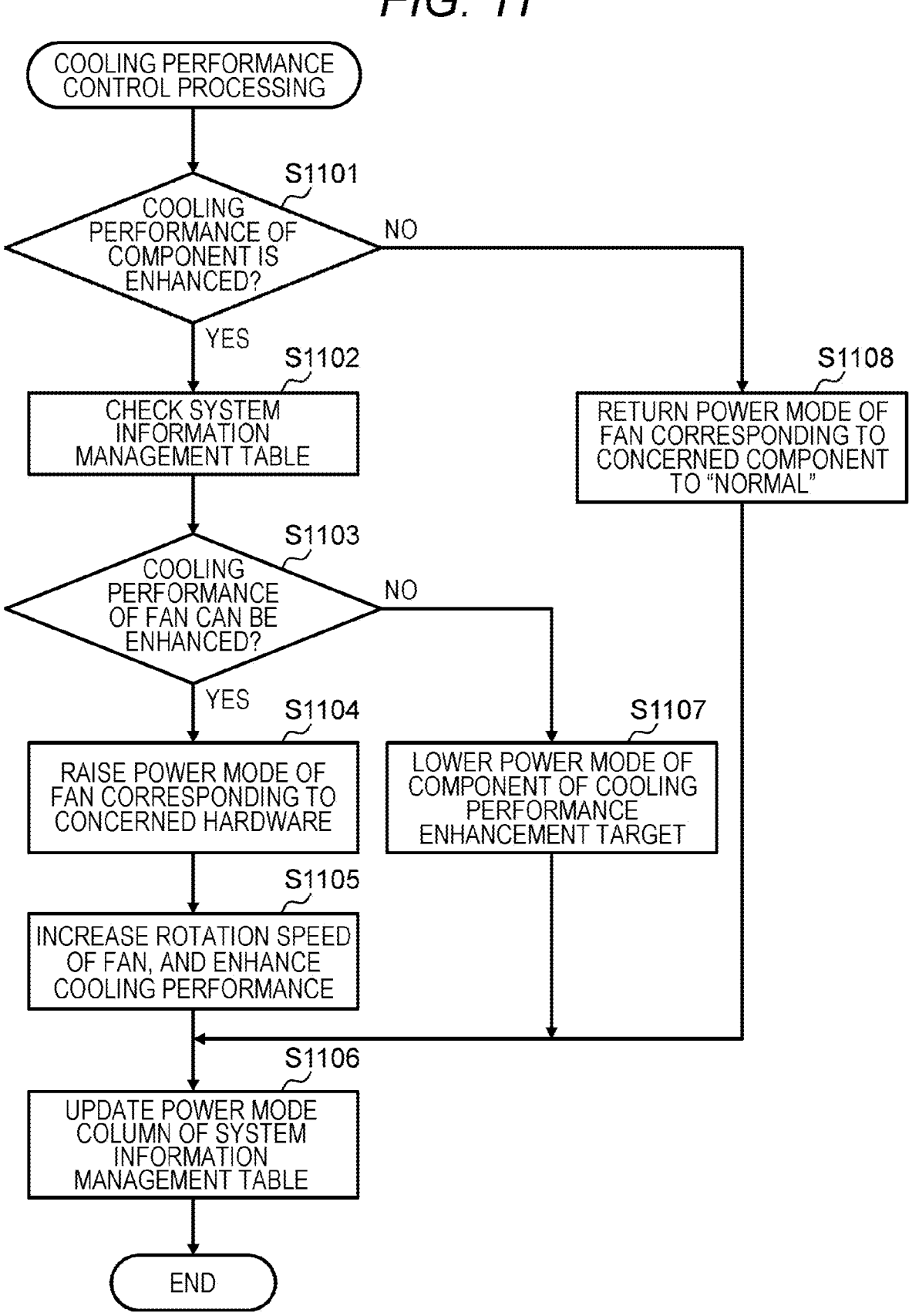
FIG. 11 is a flowchart illustrating an example of a procedure of cooling performance control processing.

FIG. 11 is a flowchart illustrating an example of a procedure of cooling performance control processing. The cooling performance control processing is executed by the cooling performance control program 201. The cooling performance control program 201 is called from the power control program 200 or the temperature control program 202 and executed. The cooling performance control program 201 controls the cooling performance by controlling the supply power of the FAN 112 and each component.

In step S1101, the cooling performance control program 201 determines whether to enhance the cooling performance of the component (conversely, whether to return the cooling performance to "normal"). The enhancement of the cooling performance means to increase the output of the cooling device (FAN 112 in the first embodiment). This determination result depends on a program (the power control program 200 or the temperature control program 202) that calls the cooling performance control program 201. The cooling performance control program 201 executes step S1102 when enhancing the cooling performance, and executes step S1108 when not enhancing the cooling performance.

In step S1102, the cooling performance control program 201 refers to the system information management table 205 to check the power mode of the FAN 112 corresponding to the component to be cooled. For example, the components of the cooling target are the controller 104, the drive 115, and the like, and the corresponding FAN 112 is mounted on the node 103 and the drive box 113, respectively. Subsequently, the cooling performance control program 201 determines whether the cooling performance of the FAN 112 can be enhanced, namely, whether the power mode can be raised (step S1103). The cooling performance control program 201 executes step S1104 when the cooling performance can be enhanced, and the cooling performance control program 201 executes step S1107 when the cooling performance cannot be enhanced.

In step S1104, the cooling performance control program 201 increases the power supplied to the FAN 112, and sets the power mode to "0". Through this process, the cooling performance control program 201 increases the rotation speed of the FAN 112 to enhance the cooling performance (step S1105). In the case where the power mode of the FAN 112 is changed, the cooling performance control program 201 updates the power mode row of the FAN in the system information management table 205 to the power mode during the recording.

When the power supplied from FAN 112 is already the highest and when the cooling performance cannot be enhanced by controlling the rotation speed, the cooling performance control program 201 prevents heat generated by changing the power mode of the component (step S1107). At this point, a lowering width of the power mode may be one step or more. When the power mode of the component is changed, the cooling performance control program 201 updates the power mode row of the component in the system information management table 205 to the power mode during the recording.

In step S1108, the cooling performance control program 201 returns the power mode of the FAN 112 corresponding to the component to "normal". At this point, "normal" is the state of the power mode "1" or "2". When the power mode of the FAN 112 is changed, the cooling performance control program 201 updates the power mode row of the FAN in the system information management table 205 to the power mode during the recording.

In the case where the power mode of the FAN 112 or the component is changed, the cooling performance control program 201 updates the power mode row of the system information management table 205 to the power mode during the recording.

In the case where there is no need to enhance the cooling performance, the cooling performance control program 201 returns the power mode of the FAN 112 to "normal". In this case, the cooling performance control program 201 does not need to strictly determine the power mode of the FAN 112, and the power mode may be higher or lower according to the temperature state of the system. In the case where the power mode of the FAN 112 is changed, the cooling performance control program 201 updates the power mode row of the system information management table 205 of the FAN 112 to the power mode during the recording.

Figure 12:
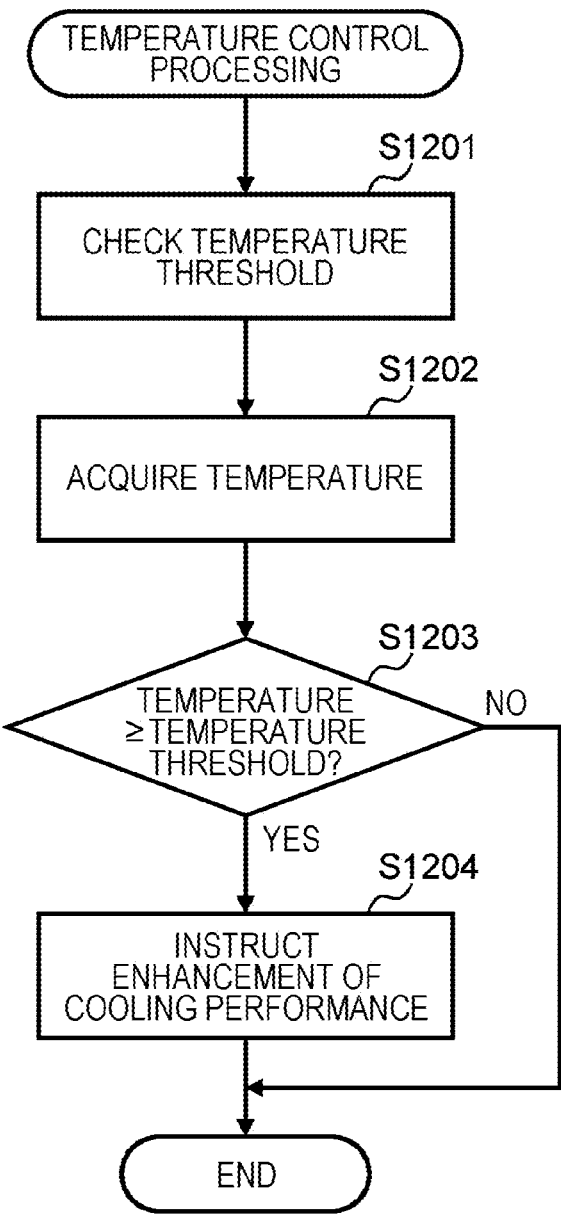
FIG. 12 is a flowchart illustrating an example of a procedure of temperature management processing.

FIG. 12 is a flowchart illustrating an example of a procedure of temperature management processing. The temperature management processing is executed by the temperature control program 202. In the temperature management processing, for example, the temperature is monitored periodically and asynchronously, and the temperature is managed by calling the cooling performance control program 201.

The temperature control program 202 first refers to the temperature management table 208 to check the temperature threshold of the controller 104 or the drive 115 (step S1201).

The temperature control program 202 checks the temperature of the controller 104 from the environmental MIC 110 mounted on the controller 104. Alternatively, the temperature of the drive 115 is acquired from a temperature sensor built in the drive 115 (step S1202).

The temperature control program 202 compares the acquired current component temperature and temperature threshold (step S1203). As a result of the comparison, when the temperature of the component does not exceed the temperature threshold, the processing is terminated. When the acquired temperature of the component exceeds the temperature threshold, the cooling performance control program 201 is instructed to enhance the cooling performance (step S1204).

Figure 13:
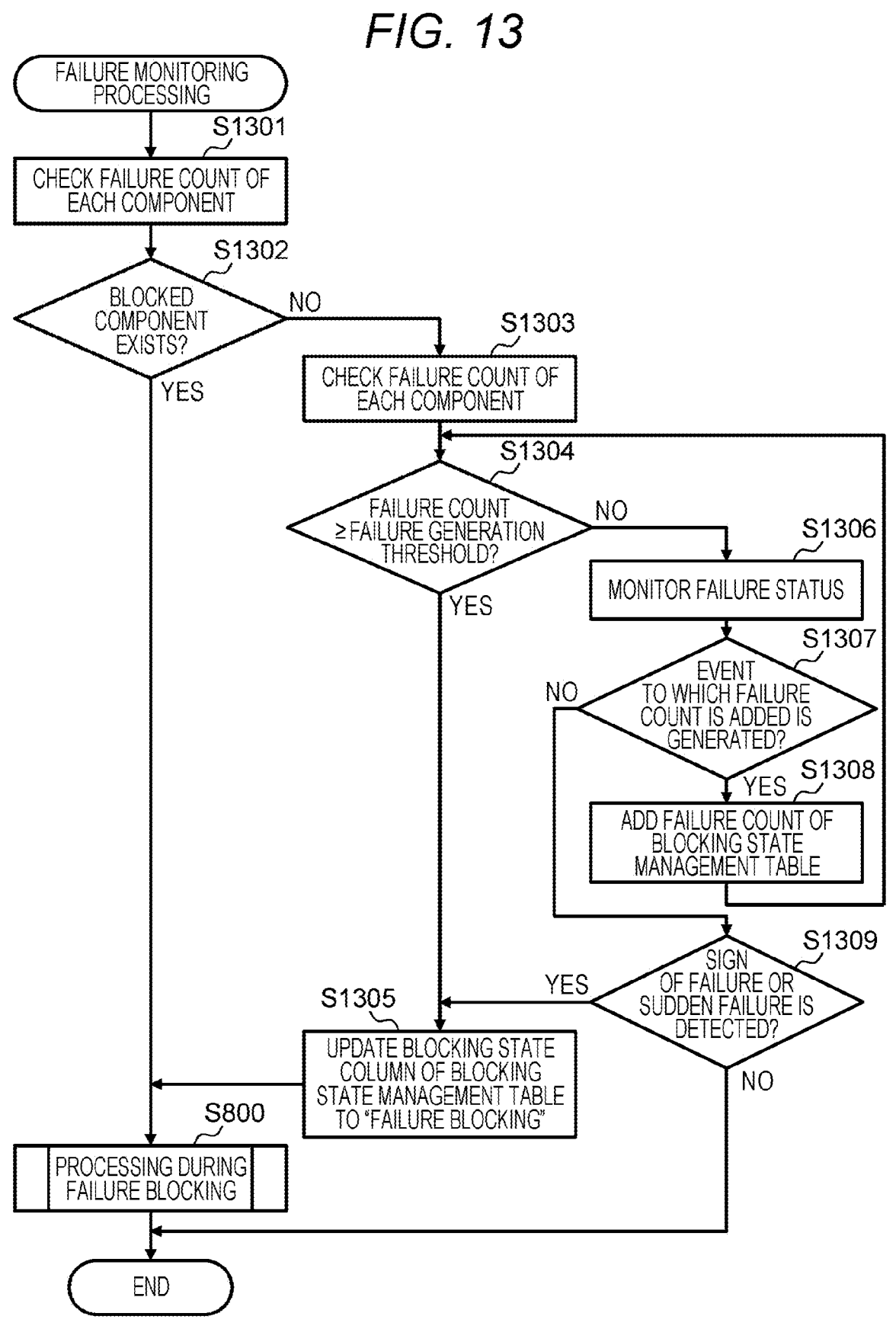

FIG. 13 is a flowchart illustrating an example of a procedure of failure monitoring processing. The failure monitoring processing is executed by the failure monitoring program 203. In the failure monitoring processing, for example, the failure state is monitored periodically and asynchronously, and the failure blocking state is updated.

The failure monitoring program 203 first refers to the blocking state management table 209 to check the failure count of each component in the storage system 100 (step S1301). For example, the failure count as used herein may be the number of read errors, which is the number of data that is not read in an attempt to be read. In addition, in the case where details are indicated for each drive type, the following example can be given as the failure count. That is, for example, when the drive 115 is a hard disk drive (HDD), the failure count may be the number of processed alternative sectors. The sector is a unit reading and writing data in the HDD. In the case where a broken sector is found, processing of replacing it with a spare is performed, and for example, in the case where the drive 115 is a solid state drive (SSD), the failure count may be the number of failed blocks. The block is a unit in which data is deleted by the NAND flash, and indicates the number of blocks that cannot be read or written.

Subsequently, the failure monitoring program 203 determines whether the component that is blocked due to the failure (hereinafter, also referred to as a "failure blocking") exists (step S1302). The failure monitoring program 203 executes processing during failure blocking (step S800) when it is determined that the failure blocking component exists, and the failure monitoring program 203 executes step S1303 when the failure monitoring component does not exist.

In step S1303 and subsequent steps, the generation of the failure and an event to which the failure count is added is monitored. First, in step S1303, the failure monitoring program 203 checks the failure count. In step S1304, the failure monitoring program 203 checks whether the failure count exceeds a failure generation threshold. The failure monitoring program 203 executes step S1305 when determining that the failure count exceeds the failure occurrence threshold, and the failure monitoring program 203 executes step S1306 when not determining that the failure count exceeds the failure occurrence threshold.

In step S1305, the failure monitoring program 203 updates the blocking state row of the blocking state management table 209 to "failure blocking". The failure monitoring program 203 executes the processing during the failure blocking.

In step S1306, the failure monitoring program 203 monitors a failure status. The failure monitoring program 203 determines whether the event to which the failure count is added is generated during the failure monitoring (step S1307). The failure monitoring program 203 executes step S1308 when the event is generated, and the failure monitoring program 203 executes step S1309 when the event is not generated.

In step S1308, the failure count of the blocking state management table is added. On the other hand, in step S1309, the failure monitoring program 203 determines whether the sign of the failure or the sudden failure is generated. When the sign of the failure or the sudden failure is generated, the failure monitoring program 203 executes step S1305, and otherwise ends the failure monitoring processing.

Figure 14:
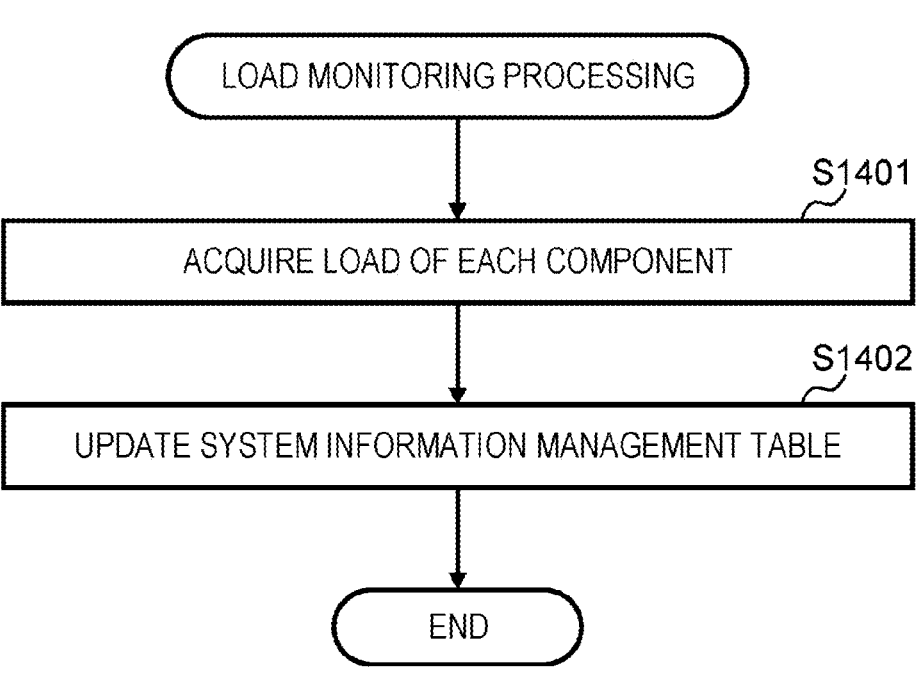
FIG. 14 is a flowchart illustrating an example of a procedure of load monitoring processing.

FIG. 14 is a flowchart illustrating an example of a procedure of load monitoring processing. The load monitoring processing is executed by the load monitoring program 204. In the load monitoring processing, for example, the load status of each component is periodically monitored. For example, the "load" mentioned here is the load status of the CPU 108 for the controller 104, and is the load of I/O processing for the drive 115. The load information to be monitored is not limited thereto, and for example, load information about other components or other items may be used.

First, the load monitoring program 204 acquires the load of each component (step S1401). Information about the load obtained here (also referred to as "load information") is recorded in the load row of the system information management table 205 (step S1402).

(2) Second Embodiment

A storage system according to a second embodiment has substantially the same configuration and operation as the storage system according to the first embodiment, so that description of the same configuration and operation will be omitted, and hereinafter, different points will be mainly described.

FIG. 15 is a flowchart illustrating an example of a procedure of drive blocking processing of blocking a part of the drive in association with refilling work. The drive blocking processing is executed by the power control program 200. The case where a part of the drive 115 is blocked along with the maintenance work is illustrated in the drive blocking processing.

At this point, for example, the maintenance blocking work indicates work performed by logically cutting off connection to a certain drive 115 or work such as the cutoff of the supply power to the drive 115 or the reconnection of the connection in order to perform the replacement processing of the drive 115.

First, the power control program 200 reads the blocking state management table 209 from the memory 107, and updates the blocking state row of the drive 115 that is the blocking target (hereinafter also referred to as "blocked drive") to "maintenance blocking" in order to be scheduled to perform the maintenance blocking work of the table (step S1501). Thereafter, the person in charge who performs the maintenance blocking work, namely, the maintenance worker cuts off the power supply to the blocked drive 115 (step S1502). However, in the case where the power supply to the drive 115 due to the maintenance block is not required to be stopped, the power supply may not be cut off.

After the cutoff of the power supply, the power control program 200 refers to the parity group configuration information table 207 to select the drive belonging to the same parity group as the blocked drive 115 as a "performance-required drive" (step S1503). The "performance-required drive" is a drive in which the load is expected to increase with the increase in a read or write amount in accordance with the processing during the blocking, and one or the plurality of drives may be selected.

Subsequently, the power control program 200 calls the cooling performance control program 201 to enhance the cooling performance of the FAN 112 corresponding to the performance-required drive 115 (step S1504). Subsequently, the power control program 200 sets the power mode to the state as high as possible, for example, the power mode "0" or "1", for the performance-required drive 115 (step S1505).

The power mode "0" is a mode that raises the operation performance so as to maximize the processing capacity and allows the power consumption to increase to the maximum accordingly. For example, the power mode "1" is a power mode in which the power is supplied such that the processing capability can be exhibited up to about 80%, and the power mode "0" is a power mode in which the power is supplied such that the processing capability can be exhibited by 100%.

The power mode of the component described above is determined with reference to the load information recorded in the system information management table 205 and the processing capability of the power mode table 206. In the case where the component in which the power mode is changed exists, the power control program 200 updates the power mode row of the system information management table 205 to the power mode during the recording (step S1506).

However, in the case where the plurality of performance-required drives 115 exist and it is difficult to uniformly raise the power mode, the power mode may be not required to be raised, or the power that can be supplied to each drive may be obtained by the calculation to improve the performance as much as possible. In the case where the suppliable power is obtained by the calculation, the minimum power mode that does not exceed the current supply power among the power modes defined in the power mode table 206 is recorded in the power mode row of the system information management table 205. That is, for example, in the case where the drive 115 is the SSD and in the case where the supply power is 17 W, the power mode is recorded as "1".

FIG. 16 is a flowchart illustrating an example of the procedure of the sudden blocking processing. FIG. 16 corresponds to FIG. 8 in the first embodiment. The sudden blocking processing is executed by the power control program 200. The sudden blocking processing is processing in the case where the failure is generated in the drive 115 to become the blocking state. At this point, the "failure blocking" refers to a situation in which communication with a device is suddenly cut off during operation of the storage system 100, for example, due to the failure of the component. In the generation of the failure, a situation other than the example described above may be generated.

The power control program 200 first refers to the blocking state management table 209 to check the blocking state of the drive 115 (step S1601). The power control program 200 determines whether the drive 115 is in the blocking state (step S1602). When the blocked drive 115 exists, the power control program 200 proceeds to the power mode switching processing (step S1603). On the other hand, when the blocked drive 115 does not exist, the power control program 200 ends the sudden blocking processing.

In step S1603 and subsequent steps, processing of switching the power mode for improving the performance during the failure blocking processing will be described. First, in step S1603, the power control program 200 refers to the parity group configuration information table 207 to select the drive 115 belonging to the same parity group as the blocked drive 115 as the "performance-required drive". Subsequently, in step S1604, the power control program 200 refers to the system information management table 205 to acquire the power consumption and the power mode of the performance-required drive 115.

In addition, the power control program 200 refers to the power mode table 206 to acquire the power consumed in each power mode. In step S1605, the power that can be supplied to the performance-required drive is calculated. In the processing of calculating the power that can be supplied, the power supplied to the power supply unit 109 of the drive box 113 is checked to calculate the maximum power that can be supplied to the performance-required drive 115. Subsequently, the power control program 200 calculates the power consumption in consideration of the increment obtained by raising the power mode of the performance-required drive 115. The power control program 200 compares this value with the power that can be additionally supplied to the performance-required drive 115 (step S1606). The power control program 200 executes step S1607 when it is determined that the power mode can be raised, and the power control program 200 executes the work during the failure blocking without changing the power mode when it is determined that the power mode cannot be raised (step S1610).

In step S1607, the power control program 200 calls the cooling performance control program 201 to enhance the cooling performance corresponding to the performance-required drive 115.

Subsequently, the power control program 200 changes the power mode of the performance-required drive 115 to the maximum setting obtained by the calculation (step S1608).

In the case where the component in which the power mode is changed, the power control program 200 updates the power mode row of the system information management table 205 to the power mode during the recording.

After the change of the power mode, the power control program 200 performs the work during the failure blocking of the drive 115 (step S1610).

Figure 17:
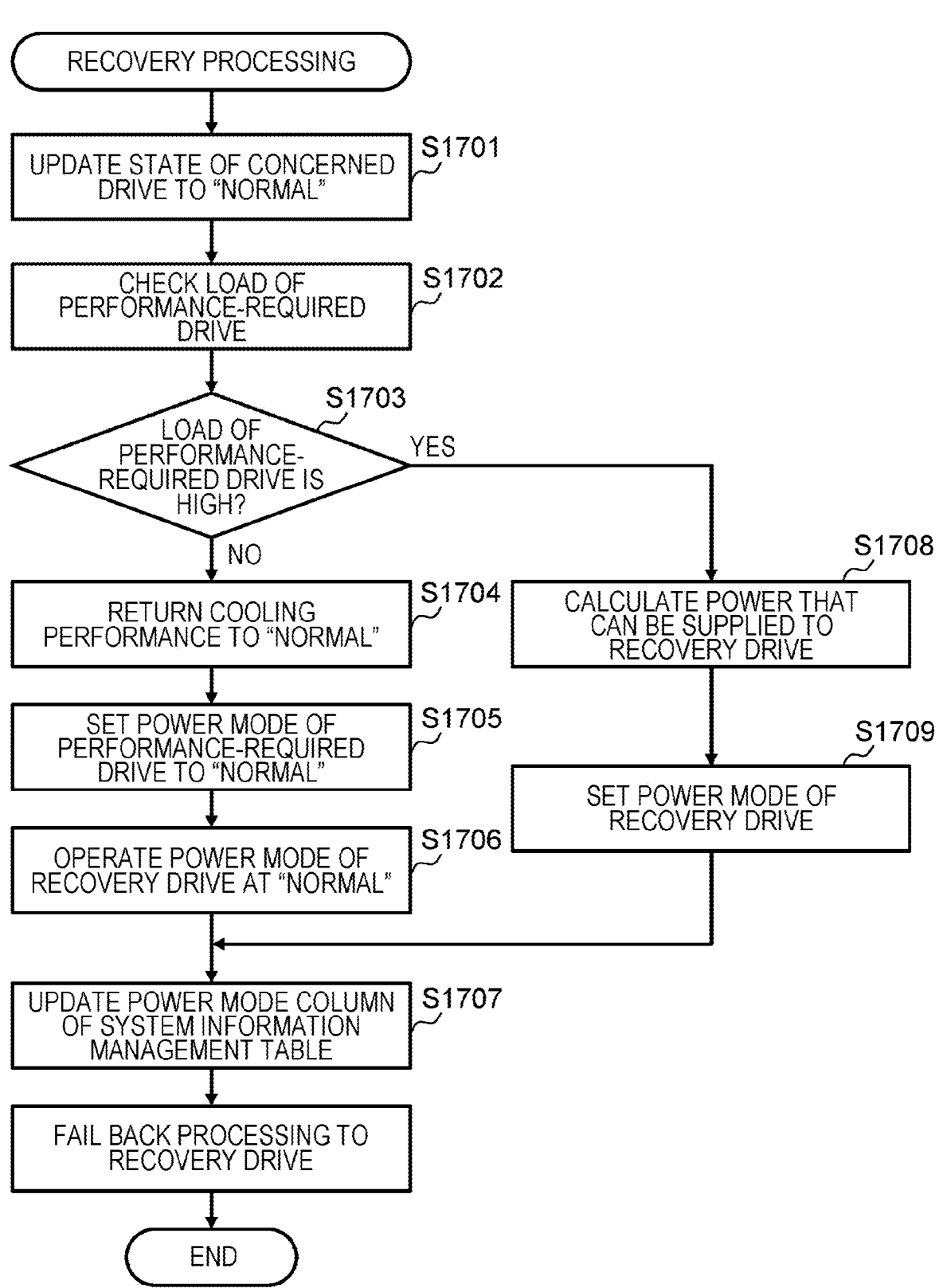
FIG. 17 is a flowchart illustrating an example of the procedure of the recovery processing.

FIG. 17 is a flowchart illustrating an example of the procedure of the recovery processing. The recovery processing is processing of recovering the blocking state of the blocking drive 115. At this point, for example, the recovery indicates that the processing during blocking is completed and the drive 115 is in the state of being able to be set to a communicable state again. The power control program 200 controls the supply power of the drive 115 in the drive box 113 through the switch 114.

After the blocked drive 115 is recovered, the power control program 200 starts the recovery operation. The recovery operation may be performed automatically after the maintenance worker finishes physical replacement of the controller 104, or may be activated by external input according to the instruction of the maintenance worker. First, the blocking state row of the drive 115 in the blocking state management table 209 is updated to "normal" (step S1701). Thereafter, the power control program 200 refers to the system information management table 205, checks the load status of the performance-required drive 115 (step S1702), and determines whether the load is high (step S1703).

In the determination in step S1703, for example, the state in which the processing is high is the state in which the load of the CPU 108 is equal to or greater than 80%. For example, the power control program 200 executes step S1704 when the load of the performance-required drive 115 is less than 80%, and the power control program 200 executes step S1707 when the load is equal to or greater than 80%. In addition, even in the case where the ratio is less than 80%, step S1707 may be executed in the case where the processing is expected to increase in the future.

In steps S1704 to S1706, processing of returning the power mode raise at the time of the blocking to the normal state is performed. First, the power control program 200 calls the cooling performance control program 201 to return the cooling performance of the FAN 112 of the redundant controller 104 to "normal" (step S1704). Subsequently, the power control program 200 returns the power mode of the performance-required drive 115 to "normal" (step S1705). After the completion of step S1705, the power control program 200 operates the power mode of the drive 115 to be recovered at "normal" (step S1706).

At this point, for example, "normal" indicated in steps S1704, S1705, S1706 corresponds to the state of "1" or "2" in principle as the power mode. The power mode may be determined according to the processing load of the CPU 108, or the power mode may be uniformly set to "2". In the recovery processing of the drive 115, in the case where the component in which the power mode is changed exists, the power mode row of the system information management table 205 is updated to the power mode during the recording (step S1707).

In steps S1708 to S1709, the operation of the recovery drive 115 is started while the power mode of the performance-required drive 115 is maintained high. First, the power control program 200 refers to the system information management table 205 to calculate the power that can be supplied to the recovery drive 115 (step S1708). Thereafter, the power control program 200 sets the minimum necessary power mode that can be set for the recovery drive based on the suppliable power obtained by the calculation and operates the recovery drive (step S1708).

Figure 18:
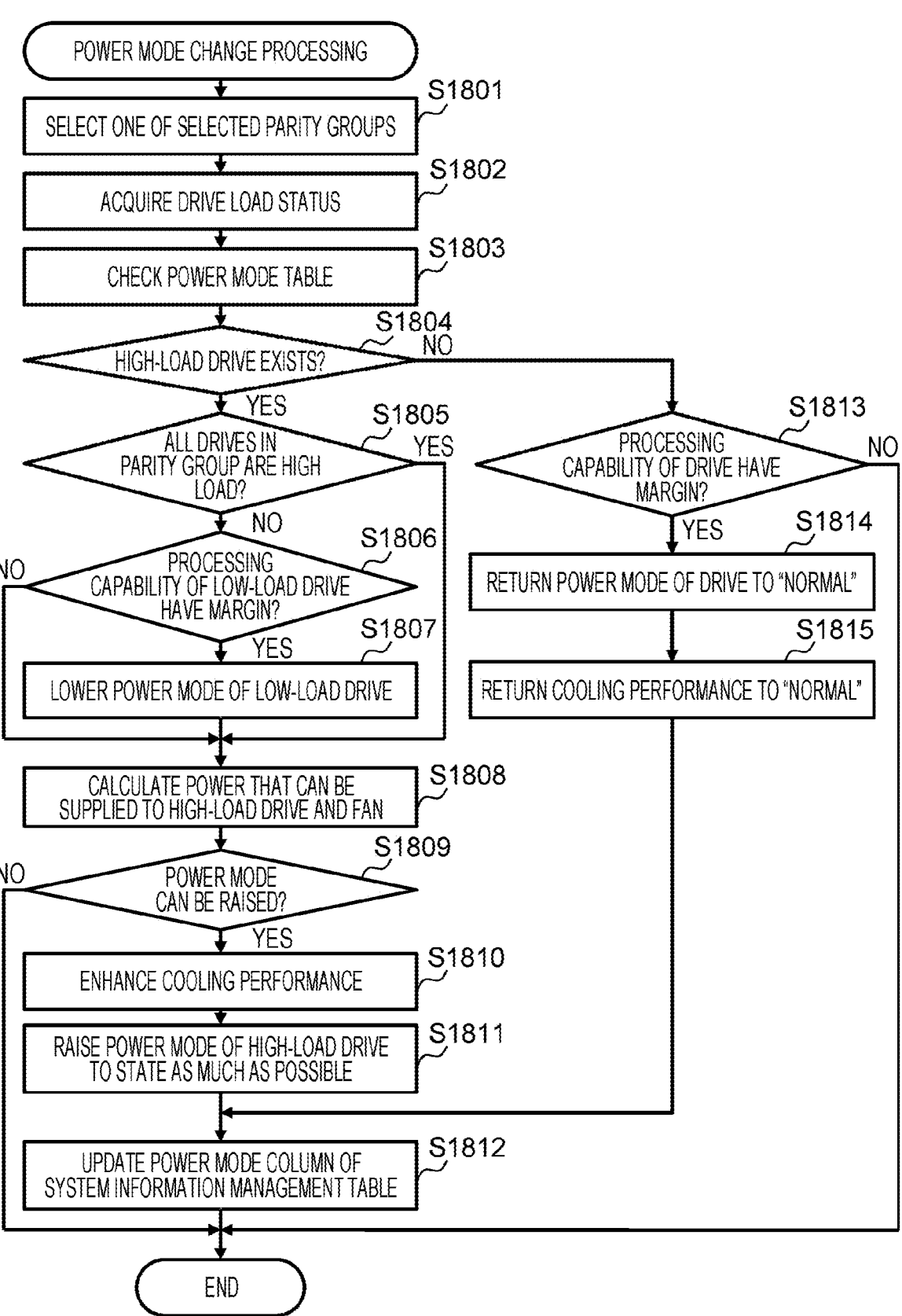
FIG. 18 is a flowchart illustrating an example of the procedure of the power mode change processing.

FIG. 18 is a flowchart illustrating an example of the procedure of the power mode change processing. The power mode change processing is processing executed by the power control program 200 in biasing the load of the drive 115 among the components. The power control program 200 controls the supply power of the drive 115 in the drive box 113 through the switch 114.

The power control program 200 first checks the parity group configuration information table 207 stored in the CPU 108, and acquires the parity group information in which one parity group is selected (step S1801). Subsequently, the power control program 200 refers to the system information management table 205 to acquire the load of each drive 115 in the parity group (step S1802). In addition, the power control program 200 refers to the power mode table 206 to also acquire the information about the power mode (step S1803). The power control program 200 uses the information about the power mode to determine whether the high-load drive 115 exists in the parity group (step S1804). The power control program 200 executes step S1805 when determining that the high-load drive 115 exists, and executes step S1813 when determining that the high-load drive 115 does not exist.

In step S1805, the power control program 200 determines whether at least one drive 115 in which the load is not high exists among the drives in the parity group. At this point, in the second embodiment, "the load is not high" means that, for example, the processing load of the drive 115 is less than 80%. The power control program 200 executes step S1806 when determining that there is one or more drives with a non-high load, and determines step S1808 when not determining that there is one or more drives with a non-high load.

In step S1806, the power control program 200 determines whether the processing capability of the low-load drive 115 determined in step S1805 has the margin. The power control program 200 executes step S1807 when it is determined that the processing capability has the margin, and the power control program 200 executes step S1808 when it is determined that the processing capability does not have the margin. The standard for determining that the margin exists in the second embodiment is that the power mode in which the current processing load can be achieved at the minimum is lower than the current power mode.

That is, for example, in the case where the current processing load is 40% and the drive 115 in which the power mode is "1" exists, about half of the processing load is applied to the processable performance of 75%. In this case, for example, even when the power mode of the CPU 108 is lowered to "2" and set to the state in which 50% of the performance can be exhibited, because it is considered that the current processing can be sufficiently completed, it is determined that the power mode is lowered to "2".

In step S1807, the power control program 200 lowers the power mode of the low-load drive 115. However, for example, in the case where the supply power of the CPU 108 is lowered, sometimes the processing load is relatively increased due to degradation of the operation performance, and thus the power mode is lowered one by one.

In step S1808, the power control program 200 calculates the power that can be supplied to the high-load drive 115 and the corresponding FAN 112. The power consumption information about the system information management table 205 acquired in step S1802 is used for this calculation. The power control program 200 calculates the total of the maximum power that can be supplied to the power supply unit and the power consumption of the operating drive, and calculates the difference therebetween to acquire the surplus power that can be supplied to the drive 115. The power control program 200 determines whether the power mode of the high-load drive 115 can be raised based on the obtained surplus power (step S1809).

The power control program 200 refers to the power mode table 206 and compares whether the increment in the power consumption accompanying the power mode raise falls within the range in which the surplus power can be supplied, whereby this determination is performed. When the power mode can be raised, step S1810 is executed. On the other hand, when it is difficult to raise the power mode, this processing ends.

In steps S1810 to S1812, the power mode raising processing of the high-load CPU 108 is performed. First, the power control program 200 calls the cooling performance control program 201 to enhance the cooling performance of the FAN 112 of the controller 104 (step S1810). Thereafter, the power control program 200 raises the power mode of the high-load CPU 108 to the state as high as possible (step S1811). The power mode at this time is determined based on the calculated surplus power. After step S1811 ends, the power control program 200 updates the power mode sequence of the system information management table 205 (step S1812), and ends this processing. In each processing from step S1808 to step S1812, when the plurality of high-load CPUs 108 exist, the processing is performed on the plurality of CPUs 108.

Steps S1813 to S1815 illustrate the case where neither the blocked portion of the drive 115 nor the high-load drive 115 exists. First, in step S1813, the power control program 200 determines whether the margin exists in the processing capability of each drive 115. Step S1813 is similar to the content performed in step S1806. When it is determined in step S1813 that the margin exists in the processing capability of each drive 115, step S1814 is executed. On the other hand, when it is determined that the margin does not exist in the processing capability of each drive 115, this processing ends.

In step S1814, the power control program 200 returns the power mode of the drive 115 to "normal". "Normal" is the state in which the appropriate power mode is set for the current processing load. Step S1814 is similar to the content performed in step S1807. In the case where it can be assumed that the processing load increases in the future or the processing load increases due to the lowering of the power mode, the power control program 200 does not need to execute step S1814. After returning the power mode of each component, the power control program 200 returns the power mode of the FAN 112 to "normal" by the cooling performance control program 201 (step S1815).

The storage system 100 of the first embodiment and the second embodiment (hereinafter, also collectively referred to as "the embodiment") as described above includes the plurality of storage drives 115 that provides a storage capacity of data, and the plurality of storage controllers 104 that executes the data write or read processing with the storage drives 115. Each of these controllers 104 includes a component (including at least a CPU) capable of changing performance by changing an amount of supplied power, and a memory 107 storing the power control program 200 controlling a target value of the power consumption of the component 108. When the power control program 200 is executed by the CPU 108, in response to detection of a blocked controller among the plurality of controllers 104, a function of raising the target value of the power consumption for a component (for example, the CPU 108) included in the controller 104 is executed in the normal controller 104 (that is, the other normal controller 104 as the handover destination of the processing executed by the one controller 104 that is blocked) configuring a redundant system with respect to the controller 104 that causes the blocking.

In this way, even when one controller 104 is blocked due to maintenance work, failure generation, or the like of some of the CPUs 108 configuring the storage system 100, the power allocated to the CPUs 108 of the remaining normal redundant controllers 104 can be optimized and the performance degradation of the entire storage system can be prevented in the state where one controller 104 is blocked.

(3) Third Embodiment

A storage system according to a third embodiment has substantially the same configuration and operation as those of the storage system according to the first embodiment or the second embodiment, so that description of the same configuration and operation will be omitted, and hereinafter, different points will be mainly described. In the storage system of the third embodiment, the reference signs attached to the respective components are different from the reference signs attached to the respective components of the storage system of the first embodiment and the second embodiment, but the respective components of the storage system of the third embodiment have substantially the same configurations as the respective components of the storage system of the first embodiment, and perform the same operations.

Figure 19:
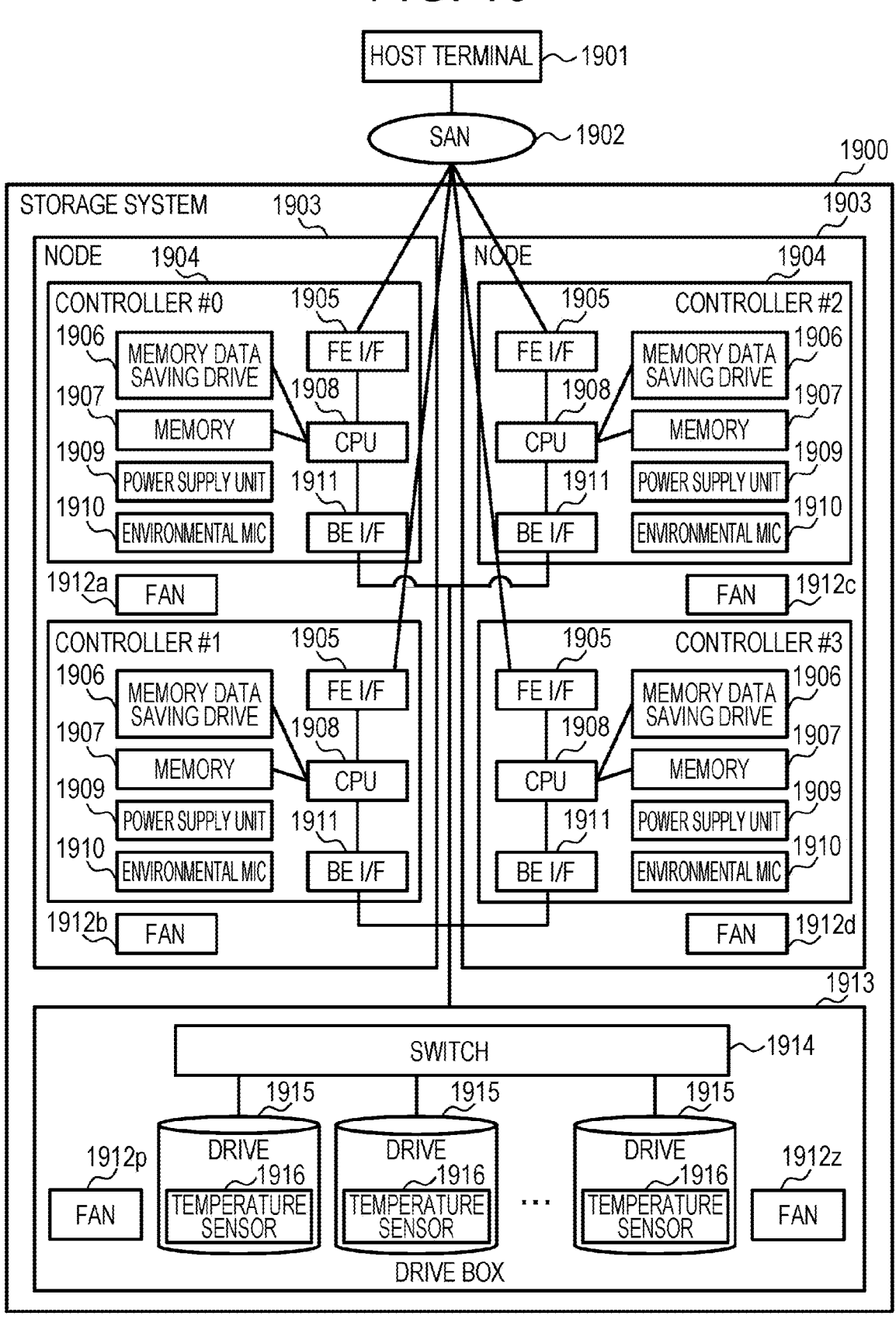
FIG. 19 is a view illustrating a configuration example of a storage system according to a third embodiment.

FIG. 19 is a view illustrating a configuration example of a storage system 1900 according to a third embodiment. The storage system 1900 includes two nodes 1903 with node numbers #0 and #1 and a drive box 1913 that stores a drive 1915 as the storage device. That is, the storage system 1900 employs a multi-node configuration in which two nodes 1903 are stored.

For example, each node 1903 includes two controllers 1904. Specifically, for example, the node 1903 having the node number #0 includes two controllers 1904 having controller numbers #0 and #1. For example, the node 1903 having the node number #1 includes two controllers 1904 having controller numbers #2 and #3. The node 1903 includes FANS 1912a to 1912d in addition to the controller 1904.

The FANs 1912a to 1912d are provided corresponding to the controllers 1904, and independently cool the controllers 1904. The drive box 1913 includes the FAN 1912b. The FANs 1912p to 1912z are provided corresponding to the drives 1915 in the drive box 1913, and independently cool the drives 1915. In the third embodiment, when the FANs 1912a to 1912b and the FANs 1912p to 1912z are not required to be particularly distinguished, they are also collectively referred to simply as "FAN 1912".

The controller 1904 has a function of providing a volume in which data is the read and write target to a host terminal 1901. The controller 1904 includes a CPU 1908, a memory 1907, a memory data saving drive 1906, a power supply unit 1909, an environmental microcomputer (environmental MIC) 1910, a front-end interface (FE I/F) 1905, and a back-end interface (BE I/F) 1911.

For example, the drive 1915 is a solid state drive (SSD) using a flash memory as a storage medium, a hard disk drive (HDD) using a magnetic disk as a storage medium, or the like. For example, the memory 1907 is a semiconductor memory such as a dynamic random access memory (DRAM). The memory data saving drive 1906 is a drive such as the SSD, for example, and is used to save the content of the memory 1907 when external power supply is lost.

The power supply unit 1909 supplies the power to the storage system 1900. The environmental MIC1910 monitors the surrounding environment. For example, the environment referred to herein is a temperature condition of the controller 1904. For example, the FE I/F 1905 is the Fibre Channel Host Bus Adapter (HBA) or the Network Interface Controller (NIC). For example, the BE I/F 1911 is a Serial Attached SCSI (SAS) HBA, a PCI Express (hereinafter, PCIe) adapter, or the NIC.

For example, each controller 1904 and the drive 1915 are connected by a switch 1914. In addition, the CPUs 1908 of the plurality of controllers 1904 are connected to each other by an interconnect such as PCIe. The CPU 1908 and the CPU 1908 may be connected through, for example, the PCIe switch.

The storage system 1900 is connected to a storage area network (SAN) 1902 such as Fibre Channel or Ethernet. The host terminal 1901 is also connected to a SAN 1902.

The SAN 1902 may include a switch and the like. In addition, a plurality of hosts may be connected to the SAN 1902. Although not illustrated in this storage configuration, the controllers 1904 are connected to each other through an interconnect switch.

Figure 20:
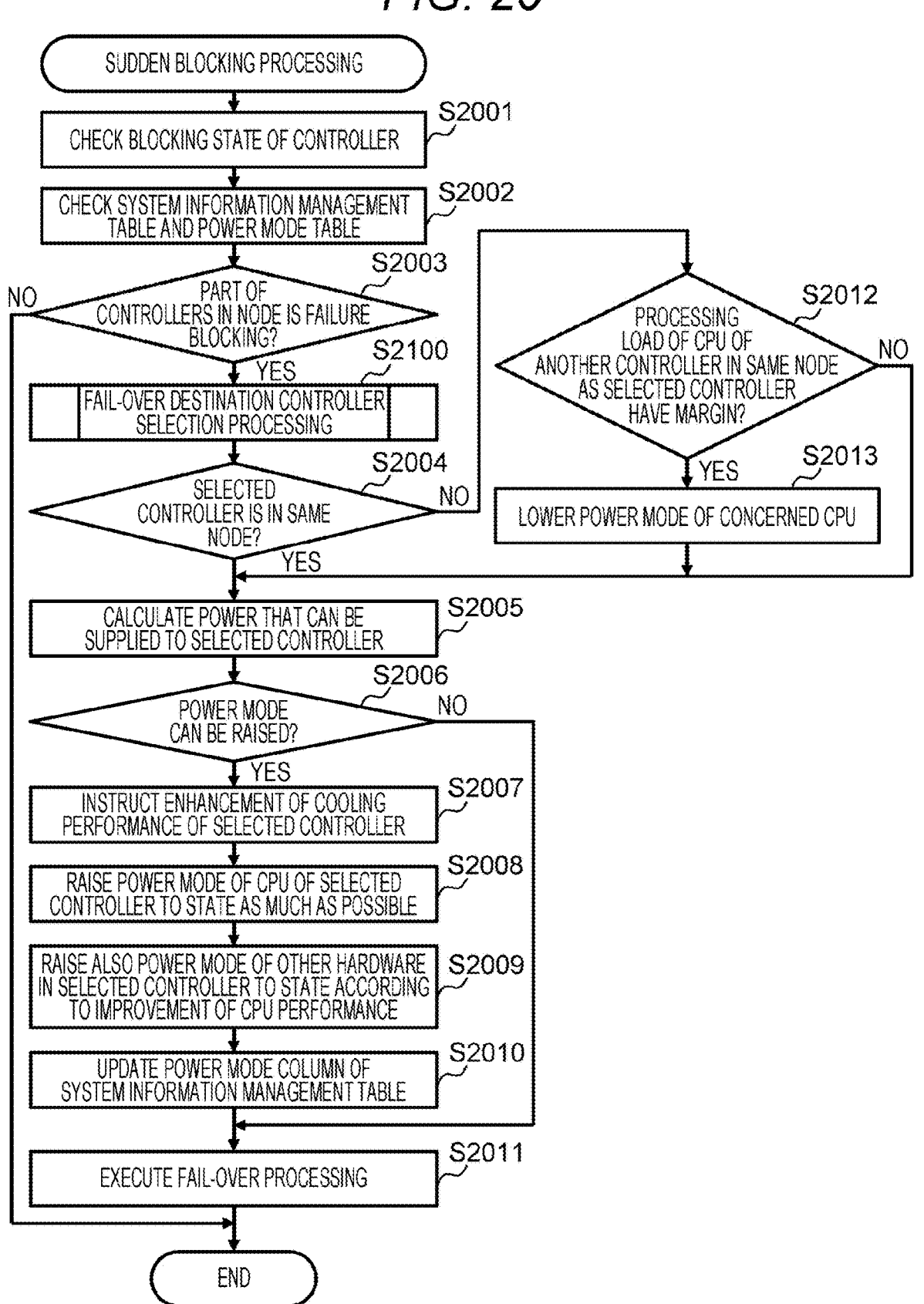
FIG. 20 is a flowchart illustrating an example of the procedure of the sudden blocking processing in the third embodiment.

FIG. 20 is a flowchart illustrating an example of the procedure of the sudden blocking processing in the third embodiment. The sudden blocking processing is executed by the power control program 200. The sudden blocking processing is processing in generating the failure in the controller 1904 to become the blocking state.

The power control program 200 first refers to the blocking state management table 209 from the CPU 1908 to confirm the blocking state of the controller 1904 (step S2101). Subsequently, the power control program 200 refers to the system information management table 205 to acquire the processing load and the power mode of each component in the controller 1904. In addition, the power control program 200 acquires the power consumption and the achievable processing capability in setting each power mode from the power mode table 206 (step S2102).

In step S2003, the power control program 200 changes the processing according to the blocking state of the controller 1904 in the node 1903. When a part of the controllers 1904 in the node 1903 is blocked, the power control program 200 executes step S2100. On the other hand, when all the controllers 1904 in the node are blocked, the power control program 200 ends the sudden blocking processing, and is not the target for the performance improvement in the third embodiment.

In step S2100 (fail-over destination controller selection processing) and steps S2004 to S2010, processing of changing the supply power is performed in order to improve the performance of the entire storage system in the state where a part of the controllers 1904 is blocked. Step S2100 is processing in which the power control program 200 selects the fail-over destination controller 1904. Details of the fail-over destination controller selection processing will be described later. After selecting the fail-over destination controller 1904 in step S2100, the power control program 200 checks the mounting position of the selected controller 1904 in step S2004. The power control program 200 executes step S2005 when the selected controller 1904 is in the same node as the blocked controller 1904, and the power control program 200 executes step S2012 when the selected controller 1904 is in another node.

In step S2005, the power control program 200 calculates the power that can be supplied to the selected controller 1904. In step S2006, the power control program 200 checks whether the power mode of the selected controller 1904 can be raised using the calculated power that can be supplied. The power control program 200 executes step S2007 when the power mode can be raised, and the power control program 200 executes step S2011 (fail-over processing) when the power mode cannot be raised. The fail-over processing in step S2011 is similar to the fail-over processing in the first embodiment and the fail-over processing of the second embodiment, the description thereof will be omitted.

In step S2007, the power control program 200 instructs the cooling performance control program 201 to enhance the cooling performance of the FAN 1912 corresponding to the selected controller 1904. Subsequently, in step S2008, the power control program 200 raises the power mode of the CPU 1908 in the selected controller 1904 to the state as high as possible.

In step S2009, the power control program 200 may raise the power mode of each component in the selected controller 1904 according to the performance improvement of the CPU 1908. When the component in which the power mode is changed exists, the power control program 200 changes the power mode row of the system information management table 205 to that during the recording.

Steps S2012 to S2013 are processing in the case where the selected controller 1904 is in another node 1903. The power control program 200 determines whether the margin in the power mode of the CPU108 in another controller belonging to the same node 1903 as the selected controller 1904 exists based on the load information about the CPU 108 acquired in step S2001 and the information about the power mode acquired in step S2002 (step S2012). The power control program 200 executes step S2013 when it is determined that the margin exists, and the power control program 200 executes step S2005 described above when it is not determined that the margin exists.

In step S2013, the power control program 200 lowers the power mode of the CPU 1908 of another controller belonging to the same node 1903 as the selected controller 1904.

Figure 21:
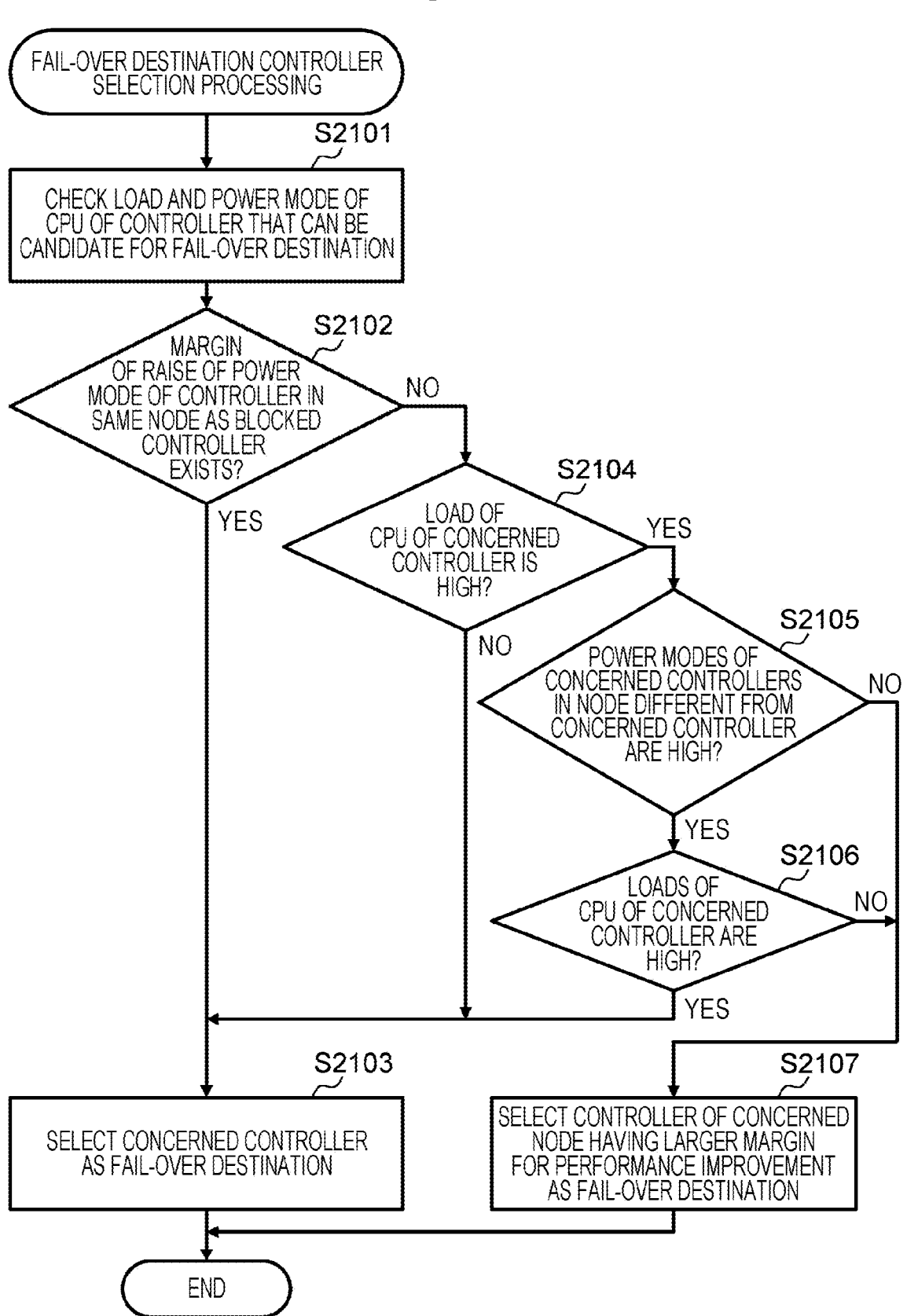
FIG. 21 is a flowchart illustrating an example of a procedure of fail-over destination controller selection processing.

FIG. 21 is a flowchart illustrating an example of a procedure of fail-over destination controller selection processing. The fail-over destination controller selection processing is executed by the power control program 200. In the fail-over destination controller selection processing, in order to improve the performance by increasing the supply power in performing the fail-over processing, the power control program 200 selects the controller 1904 satisfying that the CPU 1908 has the low load and there is room for raising the power mode (hereinafter referred to as "condition") as the fail-over destination.

On the other hand, in the case where the controller 1904 that satisfies the condition does not exist, the power control program 200 selects another controller 1904 in the node 1903 having the blocked controller 1904 as the failover destination.

The reason why the controller 1904 is preferentially selected is that the cache in the memory 1907 is duplicated in the node 1903, and the recovery from the failure is faster in the same node 1903 as the blocked controller 1904. However, in the case where all the loads of the normal controller 1904 are high and the normal controller 1904 is already operating in the state where the supply power is high, it is assumed that the improvement in the operation performance cannot be expected.

In the fail-over destination controller selection processing, the power control program 200 first refers to the system information management table 205 to acquire the load and the power mode of the CPU 1908 of the controller 1904 that can be candidates of the fail-over destination (step S2101). Subsequently, the power control program 200 performs the determination according to the acquired load and power mode of the CPU 1908 as follows, and selects the fail-over destination controller 1904.

Specifically, in step S2102, the power control program 200 checks the power mode of the CPU 108 of another controller in the same node 1903 as the blocked controller 1904. The power control program 200 executes step S2103 when it is determined that there is room for the raising, and the power control program 200 executes step S2104 when there is no room for the raising. At this point, for example, there is room for raising the power mode means that the power mode is not "0".

In step S2103, the power control program 200 selects the controller 1904 in the same node 1903 as the blocked controller 1904 as the failover destination.

In step S2104, the power control program 200 checks the load of processing performed by the CPU 1908 of another controller in the same node 1903 as the blocked controller 1904. The power control program 200 executes step S2105 when the load is high, and the power control program 200 executes step S2104 when the load is not high (that is, the margin exists). At this point, for example, the high load is the state in which the load of the CPU 1908 exceeds 80%. In addition, even when the load is less than 80%, in the case where the prediction exceeding 80% is possible in the future, step S2105 may be executed.

In step S2105, the power control program 200 changes the target controller 1904 to the controller 1904 belonging to another node 1903 different from the blocked controller 1904, and checks the power mode of the changed controller 1904. The power control program 200 checks the power mode of the changed controller 1904, and executes step S2107 when there is room to raise the power mode in any one of the controllers 1904, and the power control program 200 executes step S2106 when there is no room to raise the power mode.

In step S2106, the power control program 200 checks the load of the processing performed by the controller 1904 belonging to the node 1903 different from the blocked controller 1904. The power control program 200 executes step S2103 when the loads of all the controllers 1904 are high, and the power control program 200 executes step S2107 when the load of any one of the controllers 1904 is not high (that is, the margin exists).

In step S2107, the controller having the larger margin for the performance improvement is selected as the fail-over destination from among the controllers belonging to the node 1903 different from the blocked controller 1904. However, the larger margin for the performance improvement means the state where there is large room for raising the power mode, or the state where the processing load is lower because the power mode is the same.

The present invention is not limited to the above-described embodiments, but includes various modifications and equivalent configurations within the spirit of the appended claims. For example, the above embodiments are described in detail for easy understanding of the present invention, and the present invention is not necessarily limited to the embodiment having all the configurations described above. Furthermore, each element described in parallel in the embodiments may have an aspect in which at least one of the elements is connected in series to another element.

For example, the present invention can be applied to a storage system related to the technique of changing the performance by changing the supplied power.

What is claimed is:

1. A storage system comprising:
a plurality of storage drives that provide a storage capacity of data; and
a plurality of storage controllers that execute data write or read processing with the plurality of storage drives, wherein each of the plurality of controllers includes:
a component that includes at least a central processing unit (CPU) capable of changing performance by changing an amount of power to be supplied; and
a memory that stores a power control program controlling a target value of power consumption of the component, when the power control program is executed by the CPU, in response to detection of a blocked controller among the plurality of controllers, a function of raising the target value of the power consumption for the component included in the controller is executed in a normal controller configuring a redundant system for the controller that causes the blocking.

2. The storage system according to claim 1, wherein, when the power control program is executed by the CPU, each of the plurality of controllers monitors a load of a component included in each of the plurality of controllers, and when a controller having a component exceeding a predetermined load standard is detected, a function of raising the target value of the power consumption for the component exceeding the predetermined load standard in the controller and lowering the target value of the power consumption for other components falling below the predetermined load standard for the other components and performance of the other components is executed.

3. The storage system according to claim 2, comprising:
a cooling device that cools the controller; and
a cooling performance control program that is stored in the memory and controls cooling performance of the cooling device, wherein a function of raising output of the cooling device provided in a controller in which the target value of the power consumption is raised or in a controller including a component in which the target value of the power consumption is raised is executed when the cooling performance control program is executed by the CPU.

4. The storage system according to claim 3, wherein, when the cooling performance control program is executed by the CPU, a function of monitoring the output of the cooling device and, when the monitoring function detects that the output of the cooling device reaches a predetermined standard, a function of lowering the target value of the power consumption set for the controller in which the detected cooling device is provided are executed.

5. The storage system according to claim 4, wherein, when the power control program is executed by the CPU, in response to recovery of the blocked controller, a function of lowering the target value of the power consumption for the recovered controller and a controller configuring a redundant system is executed.

6. The storage system according to claim 5, wherein, when the power control program is executed by the CPU, a function of lowering the target value of the power consumption and the performance for a component is executed in response to the load of the component in which the target value of the power consumption is raised falling below a predetermined standard.

7. The storage system according to claim 6, wherein, when the cooling performance control program is executed by the CPU, a function of lowering the output of the cooling device provided in the controller is executed in response to detection of a controller in which the target value of the power consumption is lowered or a controller including the component in which the target value of the power consumption is lowered.

8. The storage system according to claim 1, comprising a plurality of nodes including the plurality of controllers, wherein, when the power control program is executed by the CPU, a function of allocating a controller in which the target value of the power consumption can be raised and in which the load is lower than a predetermined standard among the plurality of controllers as the blocked controller and the normal controller configuring the redundant system is executed.

9. The storage system according to claim 8, wherein, when the power control program is executed by the CPU, when it is detected that the target value of the power consumption reaches an upper limit that can be raised or a load reaches the predetermined standard in any controller included in the plurality of nodes, a function of allocating a normal controller included in a node identical to that of the blocked controller is executed as the blocked controller and a normal controller configuring a redundant system.

10. The storage system according to claim 1, wherein the power control program further controls the target value of the power consumption of the plurality of storage drives, and when the power control program is executed by the CPU, a function of raising the target value of the power consumption for at least one other storage drive is executed when a blocked storage drive is detected among the plurality of storage drives.

11. The storage system according to claim 10, wherein, when the power control program is executed by the CPU, a function of raising the target value of the power consumption for a storage drive exceeding a predetermined load standard and lowering the target value of the power consumption and performance for a storage drive that is one of the at least one other storage drive and falls below the predetermined load standard is executed when the storage drive exceeding the predetermined load standard is detected among the plurality of storage drives.

12. The storage system according to claim 11, comprising:

a cooling mechanism capable of cooling the drive; and a cooling performance control program that is stored in the memory and controls output of the cooling mechanism, wherein, when the cooling performance control program is executed by the CPU, a function of raising output of a cooling device provided to the storage drive in which the target value of the power consumption is raised is executed.

13. The storage system according to claim 12, wherein, when the cooling performance control program is executed by the CPU, a function of monitoring the output of the cooling device, and when it is detected by the monitoring function that the output of the cooling device reaches a predetermined standard, a function of lowering the target value of the power consumption for a storage drive in which the detected cooling device is provided are executed.

14. The storage system according to claim 13, wherein, when the power control program is executed by the CPU, a function of lowering the target value of the power consumption for a storage drive in which the target value of the power consumption is raised in response to blocking of a storage drive among the plurality of storage drives is executed when it is detected that the blocked storage drive is recovered, and a function of lowering the target value of the power consumption for the storage drive and performance of the storage drive is executed when it is detected that a load of the storage drive in which the target value of the power consumption is raised in response to exceeding the predetermined load standard falls below the standard.

15. The storage system according to claim 14, wherein, when the cooling performance control program is executed by the CPU, a function of lowering the output of the cooling mechanism provided to the storage drive is executed in response to detection of the storage drive in which the target value of the power consumption is lowered.

* * * * *